US008497027B2

(12) United States Patent
Branagan et al.

(10) Patent No.: US 8,497,027 B2
(45) Date of Patent: *Jul. 30, 2013

(54) UTILIZATION OF AMORPHOUS STEEL SHEETS IN HONEYCOMB STRUCTURES

(75) Inventors: Daniel James Branagan, Idaho Falls, ID (US); Jikou Zhou, Pleasanton, CA (US); Brian E. Meacham, Idaho Falls, ID (US); Jason K. Walleser, Idaho Falls, ID (US); Alla V. Sergueeva, Idaho Falls, ID (US)

(73) Assignee: The NanoSteel Company, Inc., Providence, RI (US)

( * ) Notice: Subject to any disclaimer, the term of this patent is extended or adjusted under 35 U.S.C. 154(b) by 167 days.

This patent is subject to a terminal disclaimer.

(21) Appl. No.: 12/941,866

(22) Filed: Nov. 8, 2010

(65) Prior Publication Data

US 2011/0108166 A1    May 12, 2011

Related U.S. Application Data

(60) Provisional application No. 61/258,904, filed on Nov. 6, 2009.

(51) Int. Cl.
*B32B 3/12* (2006.01)
*B32B 15/18* (2006.01)
*C22C 45/02* (2006.01)

(52) U.S. Cl.
USPC ............ 428/593; 29/897; 72/379.6; 148/403; 420/95; 420/92; 420/11

(58) Field of Classification Search
None
See application file for complete search history.

(56) References Cited

U.S. PATENT DOCUMENTS

| 4,210,443 A * | 7/1980 | Ray .............................. 148/403 |
| 5,723,225 A | 3/1998 | Yasui et al. |
| 7,186,306 B2 | 3/2007 | Branagan |
| 8,206,520 B2 * | 6/2012 | Branagan et al. ............. 148/561 |
| 2005/0224174 A1 | 10/2005 | Tsujimoto et al. |
| 2007/0029295 A1 | 2/2007 | Branagan et al. |
| 2009/0053476 A1 * | 2/2009 | Conner et al. ................. 428/174 |
| 2010/0065163 A1 * | 3/2010 | Branagan et al. ............. 148/561 |
| 2010/0092329 A1 * | 4/2010 | Branagan et al. ............... 420/14 |
| 2010/0111747 A1 * | 5/2010 | Branagan et al. ............... 420/10 |
| 2010/0154942 A1 * | 6/2010 | Branagan et al. ............. 148/543 |
| 2010/0197202 A1 * | 8/2010 | Branagan et al. ............... 451/36 |
| 2011/0094700 A1 * | 4/2011 | Branagan et al. ............... 164/63 |

(Continued)

OTHER PUBLICATIONS

Decristofaro, "Amorphous Metals in Electric-Power Distribution Applications", MRS Bulletin, vol. 23, No. 5, 1198, 50-56, 1998.

(Continued)

*Primary Examiner* — John J Zimmerman
(74) *Attorney, Agent, or Firm* — Grossman, Tucker, Perreault & Pfleger, PLLC

(57) ABSTRACT

A honeycomb structure and a method of forming an iron based glass forming honeycomb structure. The honeycomb structure may include at least two sheets, each having a thickness in the range of 0.01 mm to 0.15 mm, formed from an iron based glass forming alloy comprising 40 to 68 atomic percent iron, 13 to 17 atomic percent nickel, 2 to 21 atomic percent cobalt, 12 to 19 atomic percent boron, optionally 0.1 to 6 atomic percent carbon, optionally 0.3 to 4 atomic percent silicon, optionally 1 to 20 percent chromium. The sheets may be stacked, bonded together and formed into a honeycomb. The honeycomb structure may include a plurality of cells.

25 Claims, 19 Drawing Sheets

U.S. PATENT DOCUMENTS

| | | | |
|---|---|---|---|
| 2011/0100347 A1* | 5/2011 | Branagan et al. | 125/21 |
| 2011/0186259 A1* | 8/2011 | Branagan et al. | 164/66.1 |
| 2011/0293463 A1* | 12/2011 | Branagan et al. | 420/14 |
| 2012/0077052 A1* | 3/2012 | Demetriou et al. | 428/593 |
| 2012/0103477 A1* | 5/2012 | Branagan et al. | 148/539 |

OTHER PUBLICATIONS

Johnson, "Bulk Glass-Forming Metallic Alloys: Science and Technology," MRS Bulletin, 24 (1999), 42.

Inoue, "Stabilization of Metallic Supercooled Liquid and Bulk Amorphous Alloys," 48 (2000), 279.

Dao, et al.,"Toward a quantitative understanding of mechanical behavior of nanocrystalline metals," Acta Materialia, 55 (2007), 4041-4065.

Zhang, et al.,"Correlations for predicting plasticity or brittleness of metallic glasses." J. Alloys Compound, 2 (2007), 434-435.

Hoffman et al., "Designing metallic glass matrix composites with high toughness and tensile ductility," Nature, 451 (2008) 1085.

Wu et al., "Size-dependent shear fracture and global tensile plasticity of metallic glasses," Acta Materialia, 57 (2009), 257.

Lin et al., "Formation of Ti-Zr-Cu-Ni bulk metallic glasses," J Applied Physics, 1995(78), 6514.

Wierzbick, "Crushing Analysis of Metal Honeycombs," International Impact Engineering, 1(1983), 147-174.

Schuh et al., "Mechanical Behavior of Amorphous Alloys", Acta Materialia, 55(2007), 4067-4109.

International Search Report and Written Opinion dated Jan. 7, 2011 issued in related International Patent Application No. PCT/US10/55878.

* cited by examiner

US 8,497,027 B2

UTILIZATION OF AMORPHOUS STEEL SHEETS IN HONEYCOMB STRUCTURES

CROSS-REFERENCE TO RELATED APPLICATIONS

The present application claims the benefit of the filing date of U.S. Provisional Application No. 61/258,904, filed on Nov. 6, 2009, the teachings of which are incorporated herein by reference.

FIELD OF INVENTION

The present disclosure related to honeycomb structures that are formed from glass forming steel sheets/foils which may include spinodal glass forming matrix microconstituents and exhibit induced shear band blunting.

BACKGROUND

Honeycomb structures may be used in composite structures that may be employed in transit, marine, aerospace, architectural as well as commercial or industrial applications. For example, honeycomb structures may be employed in floor panels, wall panels, architectural facades, fire resistant panels, etc. Honeycomb panels may be formed of aluminum, NOMEX, polypropylene, paper, stainless steel, fiberglass or carbon fiber, depending on the application. Furthermore, as may be appreciated, the honeycomb structures may be sandwiched between facing materials, such as wood, polymeric materials, aluminum, steel or other metals or metal alloys. For example, aluminum honeycomb structures have been produced by a number of manufacturers including Corex, Hexcel, Panel Projects, Plascore Inc., Freeman Mfg. & Supply Co, Cellular Materials Int, PortaFab, Bellcomb, Alcan Composites, and Unicel.

SUMMARY

As aspect of the present disclosure relates to a method of forming an iron based glass forming honeycomb structure. The method may include forming at least two sheets, wherein each sheet has a thickness in the range of 0.01 mm to 0.15 mm formed from an iron based glass forming alloy comprising 40 to 68 atomic percent iron, 13 to 17 atomic percent nickel, 2 to 21 atomic percent cobalt, 12 to 19 atomic percent boron, optionally 0.1 to 6 atomic percent carbon, optionally 0.3 to 4 atomic percent silicon, optionally 1 to 20 percent chromium. The sheets may also exhibit spinodal glass matrix microconstituents including amorphous phases and/or crystalline phases of 500 nm or less. The method may also include stacking the sheets, bonding the sheets together and forming a honeycomb structure with the sheets. The honeycomb structure includes a plurality of cells.

Another aspect of the present disclosure relates to a honeycomb structure. The honeycomb structure may include at least two sheets bonded together forming a plurality of cells, wherein each sheet has a thickness in the range of 0.01 mm to 0.15 mm formed from an iron based glass forming alloy comprising 40 to 68 atomic percent iron, 13 to 17 atomic percent nickel, 2 to 21 atomic percent cobalt, 12 to 19 atomic percent boron, optionally 0.1 to 6 atomic percent carbon, optionally 0.3 to 4 atomic percent silicon, optionally 1 to 20 percent chromium. The sheets may exhibit spinodal glass matrix microconstituents including amorphous phases and/or crystalline phases of 500 nm or less.

BRIEF DESCRIPTION OF THE DRAWINGS

The above-mentioned and other features of this disclosure, and the manner of attaining them, may become more apparent and better understood by reference to the following description of embodiments described herein taken in conjunction with the accompanying drawings, wherein.

DETAILED DESCRIPTION

Figure 1:
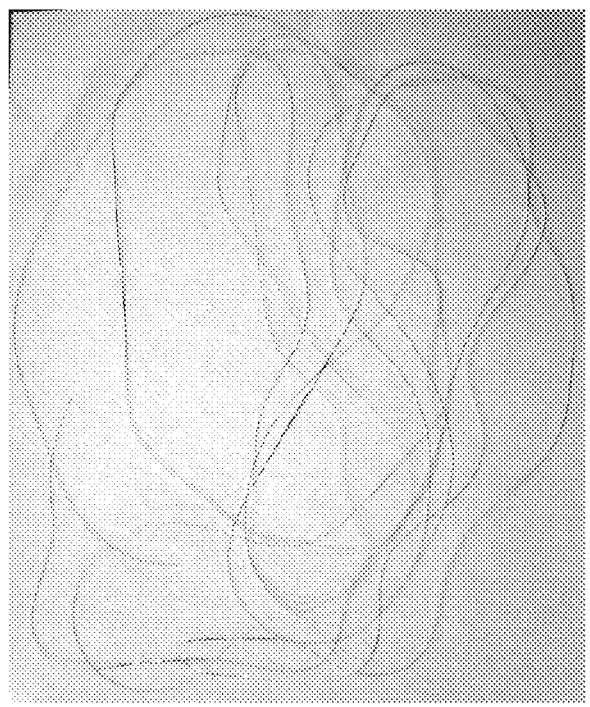
FIG. 1 illustrates an example continuous ribbon (narrow sheet) produced by melt-spinning at a tangential wheel velocity 10.5 m/s.

The present application relates to product forms for amorphous steel thin sheet/foil made into honeycomb structures, which may be utilized in a variety of industries. The relatively high strength and good ductility may enable manufacturing of honeycombs that are as light as aluminum but may be stronger by a relatively significant factor utilizing glass forming steel (GFS). In the GFS sheets, a deformation mechanism at room temperature has been recognized which, without being limited to any particular theory, may be formed by a nanoscale structure that provides for relatively extensive ductility and formability at room temperature. The mechanism is called Induced Shear Band Blunting (ISBB), which may be enabled by a nanoscale Spinodal Glass Matrix Microconstituent (SGMM) structure. Spinodal microconstituents may be understood as microconstituents formed by a transformation mechanism which is not nucleation controlled. More basically, spinodal decomposition may be understood as a mechanism by which a solution of two or more components (e.g. metal compositions) of the alloy can separate into distinct regions (or phases) with distinctly different chemical compositions and physical properties. This mechanism differs from classical nucleation in that phase separation occurs uniformly throughout the material and not just at discrete nucleation sites. One or more semicrystalline clusters or crystalline phases may therefore form through a successive diffusion of atoms on a local level until the chemistry fluctuations lead to at least one distinct crystalline phase. Semi-crystalline clusters may be understood herein as exhibiting a largest linear dimension of 2 nm or less, whereas crystalline clusters may exhibit a largest linear dimension of greater than 2 nm and up to 500 nm. Note that during the early stages of the spinodal decomposition, the clusters which are formed are small and while their chemistry differs from the glass matrix, they are not yet fully crystalline and have not yet achieved well ordered crystalline periodicity. Additional crystalline phases may exhibit the same crystal structure or distinct structures. Glass matrix phases may also be present, wherein the glass matrix may be understood to include microstructures that may exhibit associations of structural units in the solid phase that may be randomly packed together. The level of refinement, or the size, of the structural units may be in the angstrom scale range (i.e. 5 Å to 100 Å). While conventional metals deform through dislocations moving on specific slip systems, this mechanism appears to involve shear band propagation and subsequent blunting/arresting as a result of localized deformation induced changes (LDIC) in the nanoscale SGMM structure.

The glass forming steel may be formed from iron based glass forming alloys, manufactured into thin sheets/foils with thickness in the range from 0.01 to 0.15 mm, including all values and increments therein. The thin sheets or foils may be produced utilizing direct quenching processing including but, not limited to, planar flow casting, melt-spinning, and jet casting. It is contemplated that the iron based glass alloy may include at least 35 atomic percent (at. %) iron, nickel and/or cobalt in the range of about 7 to 50 at. %, at least one non/metal or metalloid selected from the group consisting of boron, carbon, and/or silicon, present in the range of about 1 to 35 at. %, and chromium present in the range of about 0 to 25 at %.

In one example, the iron based glass forming alloys may include, consist essentially of, or consist of 40 to 68 atomic percent iron, 13 to 17 atomic percent nickel, 2 to 21 atomic percent cobalt, 12 to 19 atomic percent boron, optionally 0.1 to 6 atomic percent carbon, optionally 0.3 to 4 atomic percent silicon, optionally 1 to 20 percent chromium. In a further example, the iron based glass forming alloys may include, consist essentially of, or consist of 43 to 68 atomic percent iron, 15 to 17 atomic percent nickel, 2 to 21 atomic percent cobalt, 12 to 19 atomic percent boron, optionally 1 to 6 atomic percent carbon and optionally 0.4 to 4 atomic percent silicon. In yet a further example, the iron based glass forming alloys may include, consist essentially of, or consist of 40 to 65 atomic percent iron, 13 to 17 atomic percent nickel, 2 to 12 atomic percent cobalt, 12 to 17 atomic percent boron, 0.3 to 4 atomic percent silicon and 1 to 20 atomic percent chromium. Carbon may not be present (other than as an impurity at levels of less than 1 atomic percent).

It may be therefore appreciated that iron may be present at 40.0, 40.1, 40.2, 40.3, 40.4, 40.5, 40.6, 40.7, 40.8, 40.9, 41.0, 41.1, 41.2, 41.3, 41.4, 41.5, 41.6, 41.7, 41.8, 41.9, 42.0, 42.1, 42.2, 42.3, 42.4, 42.5, 42.6, 42.7, 42.8, 42.9, 43.0, 43.1, 43.2, 43.3, 43.4, 43.5, 43.6, 43.7, 43.8, 43.9, 44.0, 44.1, 44.2, 44.3, 44.4, 44.5, 44.6, 44.7, 44.8, 44.9, 45.0, 45.1, 45.2, 45.3, 45.4, 45.5, 45.6, 45.7, 45.8, 45.9, 46.0, 46.1, 46.2, 46.3, 46.4, 46.5, 46.6, 46.7, 46.8, 46.9, 47.0, 47.1, 47.2, 47.3, 47.4, 47.5, 47.6, 47.7, 47.8, 47.9, 48.0, 48.1, 48.2, 48.3, 48.4, 48.5, 48.6, 48.7, 48.8, 48.9, 49.0, 49.1, 49.2, 49.3, 49.4, 49.5, 49.6, 49.7, 49.8, 49.9, 50.0, 50.1, 50.2, 50.3, 50.4, 50.5, 50.6, 50.7, 50.8, 50.9, 51.0, 51.1, 51.2, 51.3, 51.4, 51.5, 51.6, 51.7, 51.8, 51.9, 52.0, 52.1, 52.2, 52.3, 52.4, 52.5, 52.6, 52.7, 52.8, 52.9, 53.0, 53.1, 53.2, 53.3, 53.4, 53.5, 53.6, 53.7, 53.8, 53.9, 54.0, 54.1, 54.2, 54.3, 54.4, 54.5, 54.6, 54.7, 54.8, 54.9, 55.0, 55.1, 55.2, 55.3, 55.4, 55.5, 55.6, 55.7, 55.8, 55.9, 56.0, 56.1, 56.2, 56.3, 56.4, 56.5, 56.6, 56.7, 56.8, 56.9, 57.0, 57.1, 57.2, 57.3, 57.4, 57.5, 57.6, 57.7, 57.8, 57.9, 58.0, 58.1, 58.2, 58.3, 58.4, 58.5, 58.6, 58.7, 58.8, 58.9, 59.0, 59.1, 59.2, 59.3, 59.4, 59.5, 59.6, 59.7, 59.8, 59.9, 60.0, 60.1, 60.2, 60.3, 60.4, 60.5, 60.6, 60.7, 60.8, 60.9, 61.0, 61.1, 61.2, 61.3, 61.4, 61.5, 61.6, 61.7, 61.8, 61.9, 62.0, 62.1, 62.2, 62.3, 62.4, 62.5, 62.6, 62.7, 62.8, 62.9, 63.0, 63.1, 63.2, 63.3, 63.4, 63.5, 63.6, 63.7, 63.8, 63.9, 64.0, 64.1, 64.2, 64.3, 64.4, 64.5, 64.6, 64.7, 64.8, 64.9, 65.0, 65.1, 65.2 65.3 65.4 65.5 65.6 65.7 65.8 65.9 66.0 66.1 66.2 66.3 66.4 66.5 66.6 66.7 66.8 66.9 67.0 67.1, 67.2, 67.3, 67.4, 67.5, 67.6, 67.7, 67.8, 67.9, and/or 68.0 atomic percent. Nickel may be present at 13.0, 13.1, 13.2, 13.3, 13.4, 13.5, 13.6, 13.7, 13.8, 13.9, 14.0, 14.1, 14.2, 14.3, 14.4, 14.5, 14.6, 14.7, 14.8, 14.9, 15.0, 15.1, 15.2, 15.3, 15.4, 15.5, 15.6, 15.7, 15.8, 15.9, 16.0, 16.1, 16.2, 16.3, 16.4, 16.5, 16.6, 16.7, 16.8, 16.9, and/or 17 atomic percent. Cobalt may be present at 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, 12.0, 12.1, 12.2, 12.3, 12.4, 12.5, 12.6, 12.7, 12.8, 12.9, 13.0, 13.1, 13.2, 13.3, 13.4, 13.5, 13.6, 13.7, 13.8, 13.9, 14.0, 14.1, 14.2, 14.3, 14.4, 14.5, 14.6, 14.7, 14.8, 14.9, 15.0, 15.1, 15.2, 15.3, 15.4, 15.5, 15.6, 15.7, 15.8, 15.9, 16.0, 16.1, 16.2, 16.3, 16.4, 16.5, 16.6, 16.7, 16.8, 16.9, 17.0, 17.1, 17.2, 17.3, 17.4, 17.5, 17.6, 17.7, 17.8, 17.9, 18.0, 18.1, 18.2, 18.3, 18.4, 18.5, 18.6, 18.7, 18.8, 18.9, 19.0, 19.1, 19.2, 19.3, 19.4, 19.5, 19.6, 19.7, 19.8, 19.9, 20.0, 20.1, 20.2, 20.3, 20.4, 20.5, 20.6, 20.7, 20.8, 20.9, and/or 21.0 atomic percent. Boron may be present at 0.0, 12.0, 12.1, 12.2, 12.3, 12.4, 12.5, 12.6, 12.7, 12.8, 12.9, 13.0, 13.1, 13.2, 13.3, 13.4, 13.5, 13.6, 13.7, 13.8, 13.9, 14.0, 14.1, 14.2, 14.3, 14.4, 14.5, 14.6, 14.7, 14.8, 14.9, 15.0, 15.1, 15.2, 15.3, 15.4, 15.5, 15.6, 15.7, 15.8, 15.9, 16.0, 16.1, 16.2, 16.3, 16.4, 16.5, 16.6, 16.7, 16.8, 16.9, 17.0, 17.1, 17.2, 17.3, 17.4, 17.5, 17.6, 17.7, 17.8, 17.9, 18.0, 18.1, 18.2, 18.3, 18.4, 18.5, 18.6, 18.7, 18.8, 18.9, and/or 19.0 atomic percent. Carbon may be present 0.0, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, and/or 6.0 atomic percent. Silicon may be present at 0.0, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.3, 3.4, 3.5, 3.6, 3.7, 3.8, 3.9, and/or 4.0 atomic percent. Chromium may be present at optionally 1 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, 12.0, 12.1, 12.2, 12.3, 12.4, 12.5, 12.6, 12.7, 12.8, 12.9, 13.0, 13.1, 13.2, 13.3, 13.4, 13.5, 13.6, 13.7, 13.8, 13.9, 14.0, 14.1, 14.2, 14.3, 14.4, 14.5, 14.6, 14.7, 14.8, 14.9, 15.0, 15.1, 15.2, 15.3, 15.4, 15.5, 15.6, 15.7, 15.8, 15.9, 16.0, 16.1, 16.2, 16.3, 16.4, 16.5, 16.6, 16.7, 16.8, 16.9, 17.0, 17.1, 17.2, 17.3, 17.4, 17.5, 17.6, 17.7, 17.8, 17.9, 18.0, 18.1, 18.2, 18.3, 18.4, 18.5, 18.6, 18.7, 18.8, 18.9, 19.0, 19.1, 19.2, 19.3, 19.4, 19.5, 19.6, 19.7, 19.8, 19.9, and/or 20.0 percent. Up an additional 5 at % of total impurities may be present in the glass forming steel alloys, including all values and ranges from 0.01 at % to 5 at % at 0.01% increments. Impurities may be understood as elements or compositions that may be included in the alloys due to inclusion in the feedstock components, through introduction in the processing equipment, or by reaction of the alloy compositions with the environment.

The alloys may exhibit a critical cooling rate of about 500 to 200,000 K/s, including all values and increments therein. Therefore, the alloys may be formed by processes that may exhibit cooling rates in the range of $10^4$ to $10^6$ K/s. In one example, the alloys may be produced by weighing out or otherwise measuring the alloy constituents to form a feedstock, combining the constituents together by melting and, optionally remelting, cooling the alloy and forming the alloy into a product, such as a relatively thin sheet or foil having a thickness in the range of 0.01 mm to 0.15 mm, including all values and increments therein. Examples of manufacturing processes may include but are not limited to planar flow casting, melt spinning and jet casting. After formation and cooling, the alloys may develop a nanoscale spinodal glass matrix microconstituent structure. The sheet or foil products may then be formed into honeycomb structures using the expansion process or the corrugation process described further below. The honeycomb produced may then be utilized in energy absorption applications including but not limited to flooring, decking, aircraft, structural panels, and automobiles.

The formed alloys may exhibit an ultimate tensile strength in the range of 1 GPa to 5 GPa, including all values and increments therein, when measured at a strain rate of 0.001 $s^{-1}$. The alloys may also exhibit one or more onset crystallization temperature in the range of 360° C. to 610° C., including all values and increments therein, measured by differential thermal analysis or differential scanning calorimetry at a heating rate of 10° C./min. For example the alloys may exhibit a primary onset crystallization temperature in the range of 360° C. to 510° C. and a secondary onset crystallization temperature in the range of 440° C. to 610° C., including all values and increments therein. The alloys may exhibit a peak crystallization temperature in the range of 400° C. to 620° C., including all values and increments therein, measured by differential thermal analysis or differential scanning calorimetry at a heating rate of 10° C./min. For example, the alloys may exhibit a primary peak crystallization temperature in the range of 400° C. to 535° C. and a secondary peak crystallization temperature in the range of 450° C. to 620° C., including all values and increments therein.

In addition, the alloys may exhibit a tensile elongation of 1% to 7%, including all values and increments therein, when measured at a strain rate of 0.001 $sec^{-1}$. The alloys may also exhibit a breaking load in the range of 99.8 N to 321.0 N, including all values and increments therein. In addition, it is contemplated that the alloys formed into the honeycomb structure may exhibit a crush strength in the range of 20 to 75,000 psi (0.14 MPa to 520 MPa). Further, the honeycomb core density may be in the range of 1 lb/ft³ to 50 lb/ft³ (16 g/cm³ to 800 g/cm³).

Relatively high bend ductility and significant elongation may be maintained in the glass forming steel (GFS) sheets exhibiting Spinodal Glass Matrix Microconstituent (SGMM) structure in thickness from 0.015 mm to 0.12 mm with high cooling rates from ~$10^4$ to ~$10^6$ K/s. A summary and comparison of GFS alloys, by existing manufacturing process are provided in Table 1, including information regarding the material form, thickness and cooling rate. The details of the commercial manufacturing processes are described further below. Furthermore, the thickness where ductility has been observed in the GFS alloys (see example alloys of Table 2 and Table 3) are in the range of the listed commercial processing techniques. In addition, the cooling rates which have been found to lead to specific structures and resulting properties may be provided by the existing manufacturing processes. Thus, it is contemplated that relatively ductile narrow sheets and thin sheets/foils may be produced based on existing data and the requirements to achieve this are related to optimization of existing processes and not necessarily needing any alloy design improvements.

TABLE 1

Summary of Existing Commercial Processing Approaches

| Process | Material Form | Typical Thickness | Cooling Rate |
|---|---|---|---|
| Melt-Spinning of SGMM Alloys | Ribbon/ Narrow Sheets | 0.015 to 0.12 mm* | ~$10^4$ to ~$10^6$ K/s |
| Melt-Spinning/ Jet Casting Commercial Process | Ribbon/ Narrow Sheets | 0.02 to 0.07 mm | ~$10^4$ to ~$10^6$ K/s |
| Planar Flow Casting Sheet Process | Thin Foils/ Wide Sheets | 0.02 to 0.08 mm | ~$10^4$ to ~$10^6$ K/s |

*Range of thickness where ductile response can be maintained

The melt-spinning process may be understood herein as ejecting a liquid melt using gas pressure onto a relatively rapidly moving copper wheel. Continuous or broken up lengths of ribbons may be produced, which are typically 1 mm to 2 mm wide and 0.015 mm to 0.15 mm thick, depending on the melt spun material viscosity, the surface tension, and the wheel tangential velocity. For SGMM alloys, ribbons may generally be produced in a continuous fashion up to 25 m long (FIG. 1) using a laboratory scale melt-spinning system. It is understood that melt-spinning, also know as jet casting, has been used in commercial systems for producing magnetic materials, such as those systems operated by Magnequench International in South East Asia and by Saint-Gobain in France.

Planar flow casting may be understood as a relatively low cost-high volume technique to produce relatively wide ribbon in the form of continuous sheet. It is understood that widths of sheets up to 18.4" (215 mm) are currently produced on a commercial scale with thickness typically in the range from 0.016 mm to 0.075 mm. After production of sheets, the individual sheets may be warm pressed to roll bond the compacts into sheets. The technique may bond 5 to 20 individual sheets together but bonding over 50 sheets together may be feasible. Honeywell utilizes an example of such casting processes.

At least two methods for manufacturing the honeycomb structures may be used including the expansion process and the corrugation process. In the expansion process, glass forming alloy sheets may be rolled into relatively thin sheet and cut into desired dimensions, printed with adhesive, stacked together, cured, and then cut before being expanded into the targeted dimensions and geometric shape. This method may generally be used for making honeycombs that have relatively thin node thicknesses. In the corrugation process, relatively stronger sheets that may be relatively thicker may first be corrugated using rolling, then stacked and glued into desired honeycomb cores. A honeycomb core structure is schematically 10 shown in FIG. 2, in which terminologies and orientations are indicated. More specifically, the honeycomb may have an overall length (L), thickness (T) and width (W) and the individual sheets forming the honeycomb may exhibit a thickness (t). Furthermore, each side of a cell (C) may be formed from bond nodes and shared nodes, and may exhibit a cell thickness (s). Bond nodes 12 may be understood as cell walls that are bonded together to form the honeycomb structure and shared nodes 14 may be understood as nodes that are shared between at least two cells.

As alluded to above, honeycomb products may be utilized in numerous industries, such as aerospace, marine, automotive, trucking, rail, and military and for many applications including flooring, decking, aircraft, structural panels, automobiles, etc. For GFS alloys, it is contemplated that an advantage may be appreciated for applications where strength to weight ratios may be an important factor in allowing relatively high-strength lightweight solutions. This may include mobile applications where reducing weight to increase gas mileage while retaining ultrahigh impact strength or crush strength are the key. It may be particularly important for applications in the energy absorption structures. In these applications, relatively large plastic deformation of the honeycomb materials, the energy absorbing capabilities, high dent/indent resistance, and their failure mode under dynamic loading may be of importance. The performance of glass forming steel sheets may be evaluated using crush strengths and comparing them with commercial aluminum honeycomb cores. Note that conventional glass forming alloys, in contrast to the specific chemistries in this application, would be expected to exhibit relatively low plasticity and may not be appropriate for energy absorbing applications due to inherent brittleness.

EXAMPLES

The following examples are provided for purposes of illustration.

The glass forming chemistries were made by a variety of casting methods, with both commercial purity (allowing up to 5 at % impurity) and high purity (<1 at % impurity) feedstocks, and processed in an inert environment or in air. Using high purity elements, 15 g alloy feedstocks of the targeted alloys were weighed out according to the atomic ratios provided in Table 2 and Table 3. The feedstock materials were then placed into the copper hearth of an arc-melting system. The feedstocks were arc-melted into an ingot using high purity argon as a shielding gas. The ingots were flipped several times and re-melted to ensure homogeneity. After mixing, the ingot was then cast in the form of a finger approximately 12 mm wide by 30 mm long by 8 mm thick.

TABLE 2

Atomic Ratio's for Alloys

| ALLOY | Fe | Ni | Co | B | C | Si |
|---|---|---|---|---|---|---|
| ALLOY 1 | 53.50 | 15.50 | 10.00 | 16.00 | 4.50 | 0.50 |
| ALLOY 2 | 63.00 | 16.50 | 3.00 | 12.49 | 4.54 | 0.47 |
| ALLOY 3 | 67.54 | 16.50 | 3.00 | 12.49 | — | 0.47 |
| ALLOY 4 | 66.04 | 16.50 | 3.00 | 12.49 | 1.50 | 0.47 |
| ALLOY 5 | 64.54 | 16.50 | 3.00 | 12.49 | 3.00 | 0.47 |
| ALLOY 6 | 63.00 | 16.50 | 3.00 | 12.49 | 4.54 | 0.47 |
| ALLOY 7 | 65.54 | 16.50 | 3.00 | 14.49 | — | 0.47 |
| ALLOY 8 | 64.04 | 16.50 | 3.00 | 14.49 | 1.50 | 0.47 |
| ALLOY 9 | 62.54 | 16.50 | 3.00 | 14.49 | 3.00 | 0.47 |
| ALLOY 10 | 61.00 | 16.50 | 3.00 | 14.49 | 4.54 | 0.47 |
| ALLOY 11 | 63.54 | 16.50 | 3.00 | 16.49 | — | 0.47 |
| ALLOY 12 | 62.04 | 16.50 | 3.00 | 16.49 | 1.50 | 0.47 |
| ALLOY 13 | 60.54 | 16.50 | 3.00 | 16.49 | 3.00 | 0.47 |
| ALLOY 14 | 59.00 | 16.50 | 3.00 | 16.49 | 4.54 | 0.47 |
| ALLOY 15 | 61.54 | 16.50 | 3.00 | 18.49 | — | 0.47 |
| ALLOY 16 | 60.04 | 16.50 | 3.00 | 18.49 | 1.50 | 0.47 |
| ALLOY 17 | 58.54 | 16.50 | 3.00 | 18.49 | 3.00 | 0.47 |
| ALLOY 18 | 57.00 | 16.50 | 3.00 | 18.49 | 4.54 | 0.47 |
| ALLOY 19 | 63.30 | 16.58 | 3.01 | 12.55 | 4.56 | 0.00 |
| ALLOY 20 | 63.00 | 16.50 | 3.00 | 12.49 | 4.54 | 0.47 |
| ALLOY 21 | 62.69 | 16.42 | 2.99 | 12.43 | 4.52 | 0.97 |
| ALLOY 22 | 62.37 | 16.34 | 2.97 | 12.37 | 4.49 | 1.47 |
| ALLOY 23 | 62.06 | 16.25 | 2.96 | 12.30 | 4.47 | 1.96 |
| ALLOY 24 | 61.74 | 16.17 | 2.94 | 12.24 | 4.45 | 2.46 |
| ALLOY 25 | 61.43 | 16.09 | 2.93 | 12.18 | 4.43 | 2.96 |
| ALLOY 26 | 61.11 | 16.01 | 2.91 | 12.12 | 4.40 | 3.46 |
| ALLOY 27 | 60.18 | 16.17 | 4.50 | 12.24 | 4.45 | 2.46 |
| ALLOY 28 | 58.68 | 16.17 | 6.00 | 12.24 | 4.45 | 2.46 |
| ALLOY 29 | 57.18 | 16.17 | 7.50 | 12.24 | 4.45 | 2.46 |
| ALLOY 30 | 61.55 | 16.50 | 3.0 | 16.49 | — | 2.46 |
| ALLOY 31 | 60.05 | 16.50 | 3.0 | 16.49 | 1.50 | 2.46 |
| ALLOY 32 | 58.55 | 16.50 | 3.0 | 16.49 | 3.00 | 2.46 |
| ALLOY 33 | 57.05 | 16.50 | 3.0 | 16.49 | 4.50 | 2.46 |
| ALLOY 34 | 55.55 | 16.50 | 3.0 | 16.49 | 6.00 | 2.46 |
| ALLOY 35 | 60.05 | 16.50 | 4.50 | 16.49 | — | 2.46 |
| ALLOY 36 | 58.55 | 16.50 | 6.00 | 16.49 | — | 2.46 |
| ALLOY 37 | 57.05 | 16.50 | 7.50 | 16.49 | — | 2.46 |
| ALLOY 38 | 55.55 | 16.50 | 9.00 | 16.49 | — | 2.46 |
| ALLOY 39 | 54.05 | 16.50 | 10.50 | 16.49 | — | 2.46 |
| ALLOY 40 | 52.55 | 16.50 | 12.00 | 16.49 | — | 2.46 |
| ALLOY 41 | 51.05 | 16.50 | 13.50 | 16.49 | — | 2.46 |
| ALLOY 42 | 49.55 | 16.50 | 15.00 | 16.49 | — | 2.46 |
| ALLOY 43 | 48.05 | 16.50 | 16.50 | 16.49 | — | 2.46 |
| ALLOY 44 | 46.55 | 16.50 | 18.00 | 16.49 | — | 2.46 |
| ALLOY 45 | 45.05 | 16.50 | 19.50 | 16.49 | — | 2.46 |
| ALLOY 46 | 43.55 | 16.50 | 21.00 | 16.49 | — | 2.46 |
| ALLOY 47 | 65.03 | 16.50 | 3.00 | 15.00 | — | 0.47 |
| ALLOY 48 | 51.01 | 16.50 | 12.00 | 16.49 | — | 4.00 |

TABLE 3

Atomic Ratio's for Alloys

| ALLOY | Fe | Ni | Co | B | Si | Cr |
|---|---|---|---|---|---|---|
| ALLOY 49 | 64.38 | 16.34 | 2.97 | 14.85 | 0.46 | 1.00 |
| ALLOY 50 | 63.08 | 16.01 | 2.91 | 14.55 | 0.45 | 3.00 |
| ALLOY 51 | 61.78 | 15.67 | 2.85 | 14.25 | 0.45 | 5.00 |
| ALLOY 52 | 60.48 | 15.34 | 2.79 | 13.95 | 0.44 | 7.00 |
| ALLOY 53 | 58.53 | 14.85 | 2.70 | 13.50 | 0.42 | 10.00 |
| ALLOY 54 | 56.58 | 14.36 | 2.60 | 13.05 | 0.41 | 13.00 |
| ALLOY 55 | 55.28 | 14.03 | 2.54 | 12.75 | 0.40 | 15.00 |
| ALLOY 56 | 53.97 | 13.70 | 2.49 | 12.45 | 0.39 | 17.00 |
| ALLOY 57 | 52.02 | 13.20 | 2.40 | 12.00 | 0.38 | 20.00 |
| ALLOY 58 | 50.50 | 16.34 | 11.88 | 16.33 | 3.95 | 1.00 |
| ALLOY 59 | 49.48 | 16.01 | 11.64 | 16.00 | 3.87 | 3.00 |
| ALLOY 60 | 48.46 | 15.68 | 11.39 | 15.67 | 3.80 | 5.00 |
| ALLOY 61 | 47.44 | 15.35 | 11.15 | 15.34 | 3.72 | 7.00 |
| ALLOY 62 | 45.91 | 14.85 | 10.80 | 14.84 | 3.60 | 10.00 |

TABLE 3-continued

Atomic Ratio's for Alloys

| ALLOY | Fe | Ni | Co | B | Si | Cr |
|---|---|---|---|---|---|---|
| ALLOY 63 | 44.37 | 14.36 | 10.44 | 14.35 | 3.48 | 13.00 |
| ALLOY 64 | 43.35 | 14.03 | 10.20 | 14.02 | 3.40 | 15.00 |
| ALLOY 65 | 42.33 | 13.70 | 9.96 | 13.69 | 3.32 | 17.00 |
| ALLOY 66 | 40.81 | 13.20 | 9.60 | 13.19 | 3.20 | 20.00 |

To produce GFS narrow sheets or ribbons, the ingot fingers produced from the alloy chemistries in Table 2 and Table 3 were placed in a melt-spinning chamber in a quartz crucible with a hole diameter of ~0.81 mm. The ingots were melted in a ⅓ atm helium atmosphere using RF induction and then ejected onto a 245 mm diameter copper wheel which was traveling at tangential velocities from 5 to 39 m/s. The resulting ribbons and narrow sheets that were produced had widths typically from 0.8 mm to 1.5 mm, thicknesses from 0.02 mm to 0.25 mm, and lengths that are in the range of 1 to 30 m. In the melt-spinning process, the primary direction of heat flow may be considered one-dimensional (i.e. in the thickness direction) conduction through the chill surface of the copper wheel. Thus, the properties for wider sheets (i.e. thin foils) for example may be expected to be similar based on the heat transfer conditions. To produce wider ribbons in melt-spinning, the nozzle geometry can be changed from a circular cross section to a wide/slit configuration. Analogous heat transfer conditions and nozzle changes are occurring with planar flow casting.

In Table 4, the typical ribbon thickness range for the alloys produced as a function of wheel tangential velocity is shown. Based on the thickness, the cooling rate can be estimated using the relation:

$$dT/dt = 10/(dc)2.$$

Figure 3:
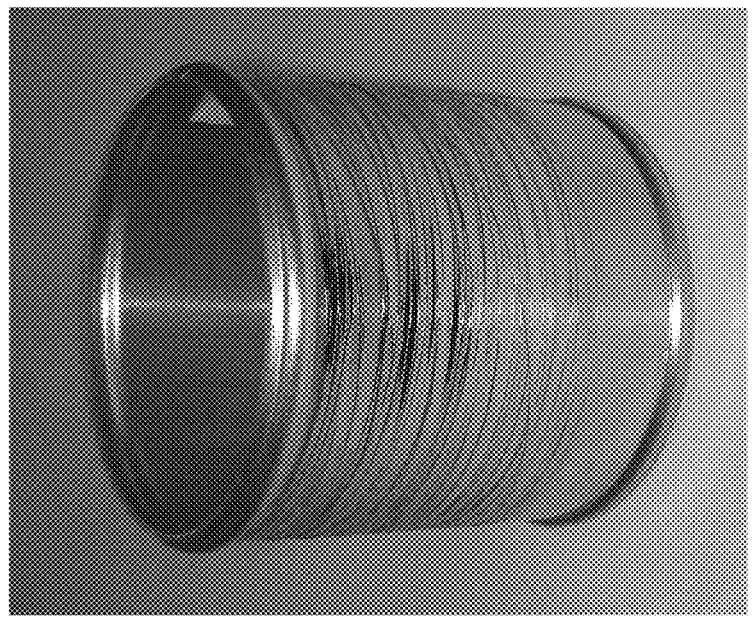
FIG. 3 illustrates an example spool of narrow foil produced at a tangential wheel velocity of 10.5 m/s.

The estimated cooling rate range is shown for each ribbon thickness in Table 4. The cooling rates available in melt-spinning using normal parameters range from $2.5 \times 10^6$ to $16 \times 10^3$ K/s. Preferred cooling rates based on the known ductility range is in the range of $10^3$ to $10^6$ K/s. An example spool of narrow sheet processed at 10.5 m/s is shown in FIG. 3.

TABLE 4

Thickness/Cooling Rate Dependence

| Wheel Speed (m/s) | Ribbon Thickness (μm) | Cooling Rate, K/s | |
|---|---|---|---|
| | | Thin | Thick |
| 39 | 20-25 | 2,500,000 | 1,600,000 |
| 30 | 30-40 | 1,111,111 | 625,000 |
| 16 | 50-60 | 277,778 | 204,082 |
| 10.5 | 70-80 | 204,082 | 156,250 |
| 7.5 | 120-140 | 69,444 | 51,020 |
| 5 | 180-250 | 30,864 | 16,000 |

Thermal analysis was performed on the as-solidified narrow sheets using a Perkin Elmer DTA-7 system with the DSC-7 option. Differential thermal analysis (DTA) and differential scanning calorimetry (DSC) was performed at a heating rate of 10° C./min with samples protected from oxidation through the use of flowing ultrahigh purity argon. In Table 5, DSC data relating to the glass to crystalline transformation are shown for the alloys listed in Table 2 that were melt-spun at 10.5 m/s. In Table 6, DSC data relating to the glass to crystalline transformation are shown for the alloys listed in Table 3 that have been melt-spun at 16 m/s.

As can be seen, the majority of samples exhibit glass to crystalline transformations. The glass to crystalline transformation occurs in either one stage or two stages in the range of temperature from 366° C. to 618° C. and with enthalpies of transformation from −1.9 J/g to −173.9 J/g. More specifically, primary glass to crystalline onset temperatures may range of 366° C. to 506° C. and secondary glass to crystalline onset temperatures may range from 440° C. to 606° C. Primary glass to crystalline peak temperatures may range from 403° C. to 532° C. and secondary glass to crystalline peak temperatures may range from 451° C. to 618° C.

TABLE 5

DTA Data for Table 2 Series Alloys Melt-Spun

| ALLOY | Wheel Speed (m/s) | Peak #1 Onset (° C.) | Peak #1 Peak (° C.) | ΔH (−J/g) | Peak #2 Onset (° C.) | Peak #2 Peak (° C.) | ΔH (−J/g) |
|---|---|---|---|---|---|---|---|
| ALLOY 1 | 10.5 | 468 | 473 | 127.2 | — | — | — |
| ALLOY 2 | 10.5 | 433 | 444 | 46.2 | 476 | 481 | 99.0 |
| ALLOY 3 | 10.5 | — | — | — | — | — | — |
| ALLOY 4 | 10.5 | — | — | — | — | — | — |
| ALLOY 5 | 10.5 | — | — | — | — | — | — |
| ALLOY 6 | 10.5 | 435 | 450 | 164.0 | — | — | — |
| ALLOY 7 | 10.5 | 366 | 403 | 22.2 | 461 | 470 | 55.3 |
| ALLOY 8 | 10.5 | 422 | 438 | 53.2 | 470 | 479 | 107.3 |
| ALLOY 9 | 10.5 | 440 | 449 | 24.4 | 471 | 477 | 75.5 |
| ALLOY 10 | 10.5 | 447 | 455 | 10.7 | 471 | 476 | 39.4 |
| ALLOY 11 | 10.5 | 427 | 434 | 10.0 | 440 | 451 | 85.4 |
| ALLOY 12 | 10.5 | 445 | 467 | 122.0 | — | — | — |
| ALLOY 13 | 10.5 | 463 | 470 | 117.1 | — | — | — |
| ALLOY 14 | 10.5 | 466 | 471 | 122.0 | — | — | — |
| ALLOY 15 | 10.5 | 451 | 460 | 133.1 | — | — | — |
| ALLOY 16 | 10.5 | 461 | 467 | 122.3 | — | — | — |
| ALLOY 17 | 10.5 | 470 | 476 | 115.9 | — | — | — |
| ALLOY 18 | 10.5 | 506 | 532 | 17.0 | — | — | — |
| ALLOY 19 | 10.5 | 432 | 447 | 173.9 | — | — | — |
| ALLOY 20 | 10.5 | 433 | 444 | 46.2 | 476 | 481 | 99.0 |
| ALLOY 21 | 10.5 | 436 | 446 | 38.7 | 479 | 485 | 72.9 |
| ALLOY 22 | 10.5 | 443 | 453 | 36.7 | 485 | 491 | 74.0 |
| ALLOY 23 | 10.5 | 453 | 464 | 34.9 | 491 | 498 | 64.4 |
| ALLOY 24 | 10.5 | 466 | 474 | 49.7 | 495 | 507 | 39.8 |
| ALLOY 25 | 10.5 | 466 | 475 | 54.8 | 504 | 513 | 68.0 |
| ALLOY 26 | 10.5 | 476 | 484 | 42.0 | 510 | 522 | 14.0 |
| ALLOY 27 | 10.5 | 456 | 464 | 21.5 | 488 | 497 | 7.8 |
| ALLOY 28 | 10.5 | 455 | 464 | 13.5 | 490 | 498 | 2.5 |
| ALLOY 29 | 10.5 | 455 | 463 | 8.9 | 491 | 499 | 1.9 |
| ALLOY 30 | 10.5 | 461 | 467 | 60.0 | 475 | 480 | 87.0 |
| ALLOY 31 | 10.5 | 469 | 475 | 131.0 | 606 | 618 | 7.7 |
| ALLOY 32 | 10.5 | 476 | 482 | 120.0 | — | — | — |
| ALLOY 33 | 10.5 | 496 | 502 | 134.0 | — | — | — |
| ALLOY 34 | 10.5 | 497 | 502 | 133.0 | — | — | — |
| ALLOY 35 | 10.5 | 463 | 468 | 50.0 | 476 | 483 | 76.0 |
| ALLOY 36 | 10.5 | 462 | 467 | 50.0 | 477 | 484 | 81.0 |
| ALLOY 37 | 10.5 | 465 | 473 | 53.0 | 479 | 486 | 54.0 |
| ALLOY 38 | 10.5 | 463 | 470 | 49.6 | 480 | 487 | 54.6 |
| ALLOY 39 | 10.5 | 465 | 471 | 15.2 | 482 | 490 | 15.3 |
| ALLOY 40 | 10.5 | 465 | 472 | 18.0 | 483 | 490 | 26.0 |
| ALLOY 41 | 10.5 | 463 | 471 | 25.6 | 484 | 491 | 36.0 |
| ALLOY 42 | 10.5 | 466 | 472 | 24.0 | 483 | 491 | 34.9 |
| ALLOY 43 | 10.5 | 465 | 472 | 12.0 | 487 | 492 | 15.9 |
| ALLOY 44 | 10.5 | 456 | 468 | 24.1 | 488 | 494 | 60.3 |
| ALLOY 45 | 10.5 | 461 | 472 | 10.3 | 491 | 496 | 15.8 |
| ALLOY 46 | 10.5 | 461 | 473 | 26.5 | 492 | 498 | 40.6 |
| ALLOY 47 | 10.5 | 395 | 419 | 21.4 | 460 | 465 | 55.1 |
| ALLOY 48 | 10.5 | 488 | 494 | 60 | 501 | 507 | 35 |

TABLE 6

DTA Data for Table 3 Series Alloys

| ALLOY | Wheel Speed (m/s) | Peak #1 Onset (° C.) | Peak #1 Peak (° C.) | ΔH (−J/g) | Peak #2 Onset (° C.) | Peak #2 Peak (° C.) | ΔH (−J/g) |
|---|---|---|---|---|---|---|---|
| Alloy 49 | 16 | 394 | 420 | 8.9 | 461 | 469 | 23 |
| Alloy 50 | 16 | 398 | 420 | 9.1 | 457 | 476 | 18.6 |
| Alloy 51 | 16 | 402 | 420 | 10.5 | 462 | 476 | 17.4 |
| Alloy 52 | 16 | 404 | 422 | 10.7 | 465 | 482 | 17.1 |
| Alloy 53 | 16 | 410 | 430 | 16.6 | 498 | 512 | 19.1 |
| Alloy 54 | 16 | 411 | 435 | 23.6 | 523 | 536 | 24.9 |
| Alloy 55 | 16 | 414 | 438 | 25 | 529 | 540 | 27 |
| Alloy 56 | 16 | 416 | 442 | 34.3 | 533 | 544 | 36.2 |
| Alloy 57 | 16 | 421 | 451 | 31.1 | 536 | 549 | 31.9 |
| Alloy 58 | 16 | 486 | 494 | 49 | — | — | — |
| Alloy 59 | 16 | 485 | 493 | 45.9 | — | — | — |
| Alloy 60 | 16 | 486 | 495 | 51.6 | — | — | — |
| Alloy 61 | 16 | 478 | 492 | 56.6 | | 512* | |
| Alloy 62 | 16 | 469 | 482 | 29 | 524 | 533 | 43.9 |
| Alloy 63 | 16 | 462 | 478 | 30.5 | 535 | 544 | 36.7 |
| Alloy 64 | 16 | 469 | 476 | 45.5 | 488 | 494 | 60.5 |
| Alloy 65 | 16 | 459 | 479 | 29.7 | 541 | 552 | 34.3 |
| Alloy 66 | 16 | 463 | 485 | 27.1 | 544 | 556 | 31.4 |

*Overlapping peaks, peak 1 and peak 2 enthalpy combined

The mechanical properties of the narrow foils were measured at room temperature using microscale tensile testing. The testing was carried out in a commercial tensile stage made by Fullam® (Clifton Park, N.Y.) which was monitored and controlled by a MTEST Windows software program. The deformation was applied by a stepping motor through the gripping system while the load was measured by a load cell that was connected to the end of one gripping jaw. Displacement was obtained using a Linear Variable Differential Transformer (LVDT) which was attached to the two gripping jaws to measure the change of gauge length. Before testing, the thickness and width of a thin sheet sample were carefully measured at least three times at different locations in the gauge length. The average values were then recorded as gauge thickness and width and used as input parameters for subsequent stress and strain calculation. The initial gauge length for tensile testing was set at ~9 mm with the exact value determined after the sheet was fixed, by measuring the wire span between the front faces of the two gripping jaws. All tests were performed under displacement control, with a strain rate of ~0.001 $s^{-1}$. In Table 7, a summary of the tensile test results including total elongation, ultimate tensile strength, and breaking load, is shown for each alloy listed in Table 2. In Table 8, a summary of the tensile test results including total elongation, ultimate tensile strength, and breaking load, is shown for each alloy listed in Table 3.

Note also that each sample measurement was in triplicate since occasional macroscale defects arising from the melt-spinning process can lead to localized areas with reduced properties. As can be seen, the tensile strength values are relatively high and vary from 1.08 GPa to 4.66 GPa while the total elongation values are also relatively high and vary from 1.54% to 6.80%. Breaking load varies from 99.8 N to 321.0 N. Also, note that in all cases where ductility is observed, the stress strain curve indicates that relatively effective strain hardening may be occurring.

Structure characterization work appears to demonstrate that the strain hardening may be the result of the induced shear band blunting/arresting (ISBB/ISBA), which may be enabled by the nanoscale SGMM structure. Without being limited to any particular theory, when plastic deformation is carried out by the formation and propagation of shear bands, the relatively highly localized deformation in the shear bands induces structural change within the shear band and the vicinity surrounding it. The change, including crystallization, phase transition and phase growth, is called herein local deformation induced change (LDIC), which may lead to hardening. Consequently, shear bands are arrested by LDIC of its own or of the other which runs into it. It should be noted, the deformation mechanisms including LDIC and ISBB/ISBA are enabled by the nanoscale SGMM structures that were formed with our processing parameters. More details will be provided in Case Example #4 and #5.

TABLE 7

Summary of Tensile Test Results for Table 2 Series Alloys

| ALLOY (Melt-spun at 10.5 m/s) | Total Elongation (%) | Ultimate Tensile Strength (GPa) | Breaking Load (N) |
|---|---|---|---|
| ALLOY 1 | 2.43 | 2.70 | 221.9 |
|  | 1.54 | 1.34 | 110.1 |
|  | 2.16 | 1.83 | 150.4 |
| ALLOY 2 | 4.16 | 2.68 | 294.8 |
|  | 2.43 | 1.48 | 164.1 |
|  | 3.61 | 2.38 | 261.8 |
| ALLOY 3 | 2.85 | 1.45 | 138.0 |
|  | 3.26 | 1.68 | 159.9 |
|  | 2.87 | 1.42 | 135.2 |
| ALLOY 4 | 2.56 | 1.41 | 136.2 |
|  | 2.07 | 1.49 | 143.9 |
|  | 2.43 | 1.48 | 143.0 |
| ALLOY 5 | 2.98 | 1.98 | 171.9 |
|  | 2.77 | 1.75 | 151.9 |
|  | 2.83 | 1.15 | 99.8 |
| ALLOY 6 | 2.00 | 1.23 | 105.9 |
|  | 3.81 | 1.38 | 118.8 |
|  | 2.58 | 1.19 | 102.5 |
| ALLOY 7 | 3.04 | 2.01 | 182.9 |
|  | 3.94 | 2.38 | 216.6 |
|  | 3.21 | 1.94 | 176.5 |
| ALLOY 8 | 2.33 | 1.57 | 142.9 |
|  | 2.33 | 1.50 | 136.5 |
|  | 4.27 | 2.76 | 251.2 |
| ALLOY 9 | 4.99 | 2.79 | 239.9 |
|  | 4.53 | 2.49 | 227.1 |
|  | 4.42 | 2.74 | 258.5 |
| ALLOY 10 | 3.75 | 2.09 | 188.5 |
|  | 2.30 | 1.68 | 151.2 |
|  | 2.40 | 1.93 | 173.9 |
| ALLOY 11 | 2.80 | 1.92 | 182.8 |
|  | 3.08 | 1.76 | 169.5 |
|  | 3.73 | 2.45 | 227.4 |
| ALLOY 12 | 4.02 | 2.67 | 264.9 |
|  | 3.93 | 2.54 | 266.2 |
|  | 4.02 | 2.51 | 247.0 |
| ALLOY 13 | 1.72 | 1.08 | 116.0 |
|  | 2.65 | 1.41 | 150.0 |
|  | 2.10 | 1.34 | 142.6 |
| ALLOY 14 | Breaks at gripping | | |
| ALLOY 15 | 4.39 | 2.59 | 232.1 |
|  | 3.95 | 2.42 | 216.8 |
|  | 4.69 | 2.42 | 216.8 |
| ALLOY 16 | 4.94 | 2.40 | 234.2 |
|  | 3.38 | 1.91 | 186.4 |
|  | 5.66 | 2.31 | 225.5 |
| ALLOY 17 | 2.16 | 1.26 | 123.0 |
|  | 2.60 | 1.39 | 135.7 |
|  | 2.08 | 1.36 | 132.7 |
| ALLOY 18 | Breaks at gripping | | |
| ALLOY 19 | 5.70 | 2.47 | 246.7 |
|  | 3.93 | 2.11 | 211.2 |
|  | 5.67 | 2.15 | 236.8 |
| ALLOY 20 | 4.77 | 2.35 | 242.5 |
|  | 5.66 | 2.83 | 292.1 |
|  | 4.57 | 2.52 | 260.1 |
| ALLOY 21 | 3.05 | 1.80 | 181.4 |
|  | 4.41 | 2.21 | 222.8 |
|  | 3.06 | 1.81 | 182.4 |

TABLE 7-continued

Summary of Tensile Test Results for Table 2 Series Alloys

| ALLOY (Melt-spun at 10.5 m/s) | Total Elongation (%) | Ultimate Tensile Strength (GPa) | Breaking Load (N) |
|---|---|---|---|
| ALLOY 22 | 2.61 | 1.37 | 134.8 |
| | 2.56 | 1.51 | 148.6 |
| | 2.59 | 1.37 | 134.8 |
| ALLOY 23 | 5.29 | 2.58 | 257.7 |
| | 5.24 | 2.47 | 247.3 |
| | 5.94 | 2.63 | 263.0 |
| ALLOY 24 | 5.96 | 2.93 | 283.0 |
| | 4.65 | 2.52 | 270.5 |
| | 4.31 | 3.32 | 293.2 |
| ALLOY 25 | 2.58 | 2.09 | 202.5 |
| | 5.04 | 2.98 | 288.8 |
| | 4.45 | 2.75 | 266.5 |
| ALLOY 26 | 6.80 | 2.69 | 265.2 |
| | 5.17 | 2.12 | 206.9 |
| | 4.92 | 3.45 | 284.9 |
| ALLOY 27 | 4.87 | 3.05 | 274.5 |
| | 4.33 | 2.95 | 265.5 |
| | 4.26 | 2.92 | 262.5 |
| ALLOY 28 | 4.45 | 2.79 | 251.1 |
| | 4.77 | 2.83 | 254.4 |
| | 4.21 | 3.03 | 272.3 |
| ALLOY 29 | 4.07 | 2.98 | 237.8 |
| | 3.71 | 2.76 | 220.2 |
| | 4.33 | 2.89 | 228.6 |
| ALLOY 30 | 3.56 | 2.33 | 222.2 |
| | 3.52 | 2.08 | 201.5 |
| | 3.98 | 2.11 | 202.7 |
| ALLOY 31 | 4.87 | 2.97 | 267.5 |
| | 2.90 | 2.01 | 180.6 |
| | 4.18 | 2.53 | 228.1 |
| ALLOY 32 | 4.68 | 2.80 | 252.3 |
| | 3.92 | 2.43 | 218.9 |
| | 4.33 | 3.14 | 282.6 |
| ALLOY 33 | 3.89 | 2.57 | 257.0 |
| | 3.60 | 2.45 | 244.5 |
| | 3.92 | 2.45 | 245.1 |
| ALLOY 34 | 2.43 | 2.20 | 176.5 |
| | 2.89 | 2.40 | 192.1 |
| | 3.83 | 2.79 | 250.9 |
| ALLOY 35 | 4.67 | 2.72 | 244.4 |
| | 4.77 | 3.21 | 224.6 |
| | 2.72 | 2.27 | 181.6 |
| ALLOY 36 | 4.51 | 3.21 | 256.7 |
| | 4.27 | 3.15 | 252.3 |
| | 3.84 | 3.30 | 264.1 |
| ALLOY 37 | 5.58 | 2.64 | 155.9 |
| | 4.77 | 2.36 | 143.0 |
| | 4.45 | 2.35 | 177.7 |
| ALLOY 38 | 4.59 | 2.93 | 235.9 |
| | 4.62 | 2.91 | 230.3 |
| | 4.25 | 3.34 | 261.9 |
| ALLOY 39 | 4.64 | 3.19 | 270.2 |
| | 5.66 | 3.70 | 310.8 |
| | 4.31 | 2.76 | 314.8 |
| ALLOY 40 | 4.07 | 3.17 | 264.4 |
| | 5.11 | 2.97 | 243.6 |
| | 3.82 | 2.90 | 229.2 |
| ALLOY 41 | 4.46 | 3.09 | 259.6 |
| | 5.17 | 2.80 | 241.1 |
| | 3.87 | 3.16 | 254.4 |
| ALLOY 42 | 4.65 | 3.07 | 255.7 |
| | 3.87 | 3.12 | 260.7 |
| | 4.30 | 3.13 | 222.8 |
| ALLOY 43 | 5.36 | 2.93 | 223.6 |
| | 4.28 | 2.75 | 207.9 |
| | 3.87 | 3.17 | 224.1 |
| ALLOY 44 | 3.89 | 2.52 | 190.5 |
| | 3.91 | 2.67 | 201.9 |
| | 3.66 | 3.07 | 217.0 |
| ALLOY 45 | 4.05 | 2.38 | 242.0 |
| | 3.97 | 2.66 | 275.3 |
| | 2.98 | 2.39 | 247.4 |
| ALLOY 46 | 4.35 | 2.85 | 321.0 |
| | 4.33 | 2.58 | 287.5 |
| | 4.60 | 2.67 | 298.1 |
| ALLOY 47 | 3.24 | 2.15 | 185.4 |
| | 4.29 | 2.86 | 251.1 |
| | 3.83 | 2.74 | 255.3 |
| ALLOY 48 | 5.46 | 2.93 | 220.5 |
| | 4.02 | 2.86 | 219.0 |
| | 4.08 | 2.92 | 212.0 |

TABLE 8

Summary of Tensile Test Results for Table 3 Series Alloys

| ALLOY (Melt-spun at 16 m/s) | Total Elongation (%) | Ultimate Tensile Strength (GPa) | Breaking Load (N) |
|---|---|---|---|
| ALLOY 49 | 3.70 | 3.89 | 188.2 |
| | 3.86 | 3.67 | 184.4 |
| | 3.78 | 3.98 | 201.4 |
| ALLOY 50 | 4.0 | 3.75 | 192.6 |
| | 3.6 | 3.56 | 173.8 |
| | 4.8 | 4.18 | 200.8 |
| ALLOY 51 | 4.27 | 3.51 | 175.4 |
| | 3.55 | 3.52 | 165.4 |
| | 3.22 | 3.30 | 157.8 |
| ALLOY 52 | 3.71 | 3.86 | 194.0 |
| | 4.00 | 3.81 | 192.4 |
| | 3.80 | 3.80 | 190.0 |
| ALLOY 53 | 4.00 | 3.43 | 139.9 |
| | 3.44 | 3.45 | 117.8 |
| | 4.27 | 3.51 | 115.9 |
| ALLOY 54 | 4.0 | 3.43 | 171.9 |
| | 3.4 | 3.46 | 174.8 |
| | 3.5 | 2.73 | 174.1 |
| ALLOY 55 | 3.2 | 3.83 | 157.8 |
| | 3.9 | 3.90 | 155.7 |
| | 3.7 | 4.04 | 150.6 |
| ALLOY 56 | 3.7 | 3.74 | 135.6 |
| | 3.6 | 3.92 | 154.4 |
| | 3.3 | 3.65 | 143.9 |
| ALLOY 57 | 2.9 | 3.32 | 168.5 |
| | 3.2 | 3.88 | 185.7 |
| | 2.8 | 3.55 | 164.9 |
| ALLOY 58 | 3.9 | 3.68 | 153.4 |
| | 3.9 | 4.09 | 168.1 |
| | 4.8 | 4.66 | 190.9 |
| ALLOY 59 | 3.88 | 3.51 | 171.1 |
| | 4.62 | 3.73 | 163.6 |
| | 3.73 | 3.87 | 169.1 |
| ALLOY 60 | 3.65 | 4.17 | 200.1 |
| | 4.35 | 3.85 | 184.5 |
| | 3.35 | 3.90 | 183.5 |
| ALLOY 61 | 3.44 | 3.98 | 184.0 |
| | 3.31 | 3.56 | 171.5 |
| | 3.79 | 3.94 | 173.6 |
| ALLOY 62 | 3.77 | 4.28 | 173.4 |
| | 3.20 | 4.00 | 166.4 |
| | 3.34 | 4.22 | 165.9 |
| ALLOY 63 | 2.96 | 3.62 | 156.2 |
| | 3.00 | 3.26 | 148.7 |
| | 2.98 | 3.61 | 162.7 |
| ALLOY 64 | 3.40 | 3.77 | 171.1 |
| | 2.77 | 3.67 | 168.1 |
| | 3.59 | 3.75 | 165.8 |
| ALLOY 65 | 3.09 | 3.68 | 167.6 |
| | 3.07 | 3.73 | 176.0 |
| | 3.39 | 3.67 | 173.2 |
| ALLOY 66 | 3.79 | 3.81 | 199.0 |
| | 3.66 | 3.78 | 200.9 |
| | 3.62 | 3.91 | 198.8 |

Comparative Aluminum honeycomb structures appear to be commonly made from high strength 1145/1235 O, 1100 H19, 3003, 5052, and 5056 aluminum grades. In Table 9, a comparison of tensile properties of the aluminum alloys made into foils is made. Note that aluminum thin foils are fairly brittle because of the small thickness limiting conventional ductility mechanisms. For example the aluminum 1100 grade in foil form has a tensile strength of 0.205 GPa with a 3% elongation but when in the form of a ½" diameter bar, it has a tensile strength of 0.110 GPa with a 25% elongation.

TABLE 9

Tensile Properties of Commercial Aluminum Thin Foils*

| Material | Strength GPa | Strength psi | Elongation % | Density g/cm3 | Density Lb/in3 | Specific Strength psi/(lb/in3) |
|---|---|---|---|---|---|---|
| Al 1235-H19 | 0.17 | 23,932 | 2.5 | 2.71 | 0.0977 | 244,888 |
| Al 1100-H19 | 0.21 | 29,733 | 3.0 | 2.71 | 0.0979 | 303,693 |
| Al 3003-H19 | 0.25 | 36,260 | 3.5 | 2.73 | 0.0986 | 367,644 |
| Al 5052-H19 | 0.33 | 47,863 | 4.0 | 2.68 | 0.0968 | 494,344 |
| Al 5056-H191 | 0.45 | 65,268 | 3.5 | 2.64 | 0.0954 | 684,319 |

*Property Data from "Matweb", http://www.matweb.com

It is understood that research to incorporate aluminum honeycomb into automobile structures is ongoing because aluminum alloys are relatively light and cheap. However, even the stronger aluminum foils such as 5056 H191 appear to fail at relatively low stress levels on the order of ~65 ksi (~0.45 GPa). The weaker strength limits the capabilities to improve the indent resistance, stable compressive strength, and crush plateau stress that is critical for energy absorption capability.

Aluminum foil thickness understood to be typically used to make honeycomb structures is in the range from 0.018 mm to 0.071 mm (About 0.001" to 0.003"). The cell sizes of typical honeycomb cores may vary from 1.6 mm to 25.4 mm (0.065" to 1"). Note that the planar flow casting process may yield thin sheets (foils) in the thickness range from 0.016 mm to 0.075 mm (About 0.001" to 0.003") directly upon casting which is similar to what is achieved with aluminum after extensive rolling stages.

The crush strength ($\sigma_{cr}$) of the hexagonal honeycomb may be understood herein to be a function of the plastic flow stress of node metal ($\sigma 0$), the node thickness (t) and the cell size (S, the short diameter) as given by:

$$\sigma_{cr} = 16.56\sigma_0\left(\frac{t}{S}\right)^{\frac{5}{3}}.$$

For a fixed node thickness of ~0.07 mm (~0.003" often understood to be used in making honeycombs) and varying cell sizes from 1/16" to 1.0", the density and crush strength are calculated accordingly for cores manufactured from thin aluminum sheets described above and selected alloys that are listed in Table 2 and Table 3.

As shown in Table 10, the GFS honeycomb cores have crush strengths in the range from 405 psi to 20,605 psi, which are about one order of magnitude higher than those of aluminum as seen in alloys AL1100-H19, AL1235-H19, AL3003-H19, AL5052-H19, and AL5056-H19, which may exhibit crush strengths in the range from only 23 psi to 1990 psi. In other words, it is contemplated that the honeycomb cores made using GFS sheets may be at least one order of magnitude stronger than the commercial aluminum honeycomb structures.

TABLE 10

Density of Honeycomb Core and Crush Strength

| Alloys | Cell Size inch | Cell Size mm | Honeycomb Core Density* Normalized | Honeycomb Core Density* lb/ft3 | Honeycomb Core Density* kg/m3 | Crush Strength* MPa | Crush Strength* psi |
|---|---|---|---|---|---|---|---|
| Al1100-H19 | 0.125 | 3.06 | 0.035 | 5.93 | 95.0 | 6.40 | 929 |
|  | 0.25 | 6.13 | 0.018 | 2.97 | 47.5 | 2.02 | 292 |
|  | 0.375 | 9.19 | 0.012 | 1.98 | 31.7 | 1.03 | 149 |
|  | 0.5 | 12.25 | 0.009 | 1.48 | 23.8 | 0.64 | 92 |
|  | 0.75 | 18.38 | 0.006 | 0.99 | 15.8 | 0.32 | 47 |
|  | 1 | 24.50 | 0.004 | 0.74 | 11.9 | 0.20 | 29 |
| Al1235-H19 | 0.125 | 3.06 | 0.035 | 5.93 | 95.0 | 5.18 | 752 |
|  | 0.25 | 6.13 | 0.018 | 2.97 | 47.5 | 1.63 | 237 |
|  | 0.375 | 9.19 | 0.012 | 1.98 | 31.7 | 0.83 | 120 |
|  | 0.5 | 12.25 | 0.009 | 1.48 | 23.8 | 0.51 | 75 |
|  | 0.75 | 18.38 | 0.006 | 0.99 | 15.8 | 0.26 | 38 |
|  | 1 | 24.50 | 0.004 | 0.74 | 11.9 | 0.16 | 23 |
| Al3003-H19 | 0.125 | 3.06 | 0.035 | 5.93 | 95.0 | 7.62 | 1,105 |
|  | 0.25 | 6.13 | 0.018 | 2.97 | 47.5 | 2.40 | 348 |
|  | 0.375 | 9.19 | 0.012 | 1.98 | 31.7 | 1.22 | 177 |
|  | 0.5 | 12.25 | 0.009 | 1.48 | 23.8 | 0.76 | 110 |
|  | 0.75 | 18.38 | 0.006 | 0.99 | 15.8 | 0.38 | 56 |
|  | 1 | 24.50 | 0.004 | 0.74 | 11.9 | 0.24 | 35 |
| Al5052-H19 | 0.125 | 3.06 | 0.035 | 5.93 | 95.0 | 10.06 | 1,459 |
|  | 0.25 | 6.13 | 0.018 | 2.97 | 47.5 | 3.17 | 460 |
|  | 0.375 | 9.19 | 0.012 | 1.98 | 31.7 | 1.61 | 234 |
|  | 0.5 | 12.25 | 0.009 | 1.48 | 23.8 | 1.00 | 145 |
|  | 0.75 | 18.38 | 0.006 | 0.99 | 15.8 | 0.51 | 74 |
|  | 1 | 24.50 | 0.004 | 0.74 | 11.9 | 0.31 | 46 |
| Al5056-H191 | 0.125 | 3.06 | 0.035 | 5.93 | 95.0 | 13.72 | 1,990 |
|  | 0.25 | 6.13 | 0.018 | 2.97 | 47.5 | 4.32 | 627 |
|  | 0.375 | 9.19 | 0.012 | 1.98 | 31.7 | 2.20 | 319 |
|  | 0.5 | 12.25 | 0.009 | 1.48 | 23.8 | 1.36 | 197 |
|  | 0.75 | 18.38 | 0.006 | 0.99 | 15.8 | 0.69 | 100 |
|  | 1 | 24.50 | 0.004 | 0.74 | 11.9 | 0.43 | 62 |

TABLE 10-continued

Density of Honeycomb Core and Crush Strength

| Alloys | Cell Size | | Honeycomb Core Density* | | | Crush Strength* | |
|---|---|---|---|---|---|---|---|
| | inch | mm | Normalized | lb/ft3 | kg/m3 | MPa | psi |
| Alloy 1 | 0.125 | 3.06 | 0.035 | 17.07 | 273.4 | 89.3 | 12,955 |
| | 0.250 | 6.13 | 0.018 | 8.54 | 136.7 | 28.1 | 4,081 |
| | 0.375 | 9.19 | 0.012 | 5.69 | 91.1 | 14.3 | 2,076 |
| | 0.500 | 12.25 | 0.009 | 4.27 | 68.4 | 8.9 | 1,285 |
| | 0.750 | 18.38 | 0.006 | 2.85 | 45.6 | 4.5 | 654 |
| | 1.000 | 24.50 | 0.004 | 2.13 | 34.2 | 2.8 | 405 |
| Alloy 40 | 0.125 | 3.06 | 0.035 | 17.07 | 273.4 | 105.5 | 15,299 |
| | 0.250 | 6.13 | 0.018 | 8.53 | 136.7 | 33.2 | 4,819 |
| | 0.375 | 9.19 | 0.012 | 5.69 | 91.1 | 16.9 | 2,452 |
| | 0.500 | 12.25 | 0.009 | 4.27 | 68.4 | 10.5 | 1,518 |
| | 0.750 | 18.38 | 0.006 | 2.84 | 45.6 | 5.3 | 772 |
| | 1.000 | 24.50 | 0.004 | 2.13 | 34.2 | 3.3 | 478 |
| Alloy 48 | 0.125 | 3.06 | 0.035 | 17.07 | 273.4 | 111.0 | 16,095 |
| | 0.250 | 6.13 | 0.018 | 8.53 | 136.7 | 35.0 | 5,069 |
| | 0.375 | 9.19 | 0.012 | 5.69 | 91.1 | 17.8 | 2,579 |
| | 0.500 | 12.25 | 0.009 | 4.27 | 68.4 | 11.0 | 1,597 |
| | 0.750 | 18.38 | 0.006 | 2.84 | 45.6 | 5.6 | 812 |
| | 1.000 | 24.50 | 0.004 | 2.13 | 34.2 | 3.5 | 503 |
| Alloy 49 | 0.125 | 3.06 | 0.035 | 17.07 | 273.4 | 121.3 | 17,598 |
| | 0.250 | 6.13 | 0.018 | 8.53 | 136.7 | 38.2 | 5,543 |
| | 0.375 | 9.19 | 0.012 | 5.69 | 91.1 | 19.4 | 2,820 |
| | 0.500 | 12.25 | 0.009 | 4.27 | 68.4 | 12.0 | 1,746 |
| | 0.750 | 18.38 | 0.006 | 2.84 | 45.6 | 6.1 | 888 |
| | 1.000 | 24.50 | 0.004 | 2.13 | 34.2 | 3.8 | 550 |
| Alloy 51 | 0.125 | 3.06 | 0.035 | 17.07 | 273.4 | 107.3 | 15,564 |
| | 0.250 | 6.13 | 0.018 | 8.53 | 136.7 | 33.8 | 4,902 |
| | 0.375 | 9.19 | 0.012 | 5.69 | 91.1 | 17.2 | 2,494 |
| | 0.500 | 12.25 | 0.009 | 4.27 | 68.4 | 10.6 | 1,544 |
| | 0.750 | 18.38 | 0.006 | 2.84 | 45.6 | 5.4 | 786 |
| | 1.000 | 24.50 | 0.004 | 2.13 | 34.2 | 3.4 | 486 |
| Alloy 58 | 0.125 | 3.06 | 0.035 | 17.07 | 273.4 | 142.1 | 20,605 |
| | 0.250 | 6.13 | 0.018 | 8.53 | 136.7 | 44.7 | 6,490 |
| | 0.375 | 9.19 | 0.012 | 5.69 | 91.1 | 22.8 | 3,302 |
| | 0.500 | 12.25 | 0.009 | 4.27 | 68.4 | 14.1 | 2,044 |
| | 0.750 | 18.38 | 0.006 | 2.84 | 45.6 | 7.2 | 1,040 |
| | 1.000 | 24.50 | 0.004 | 2.13 | 34.2 | 4.4 | 644 |
| Alloy 59 | 0.125 | 3.06 | 0.035 | 17.07 | 273.4 | 118.0 | 17,112 |
| | 0.250 | 6.13 | 0.018 | 8.53 | 136.7 | 37.2 | 5,390 |
| | 0.375 | 9.19 | 0.012 | 5.69 | 91.1 | 18.9 | 2,742 |
| | 0.500 | 12.25 | 0.009 | 4.27 | 68.4 | 11.7 | 1,698 |
| | 0.750 | 18.38 | 0.006 | 2.84 | 45.6 | 6.0 | 864 |
| | 1.000 | 24.50 | 0.004 | 2.13 | 34.2 | 3.7 | 535 |

*Calculated using 70 µm Node Thickness

Figure 2:
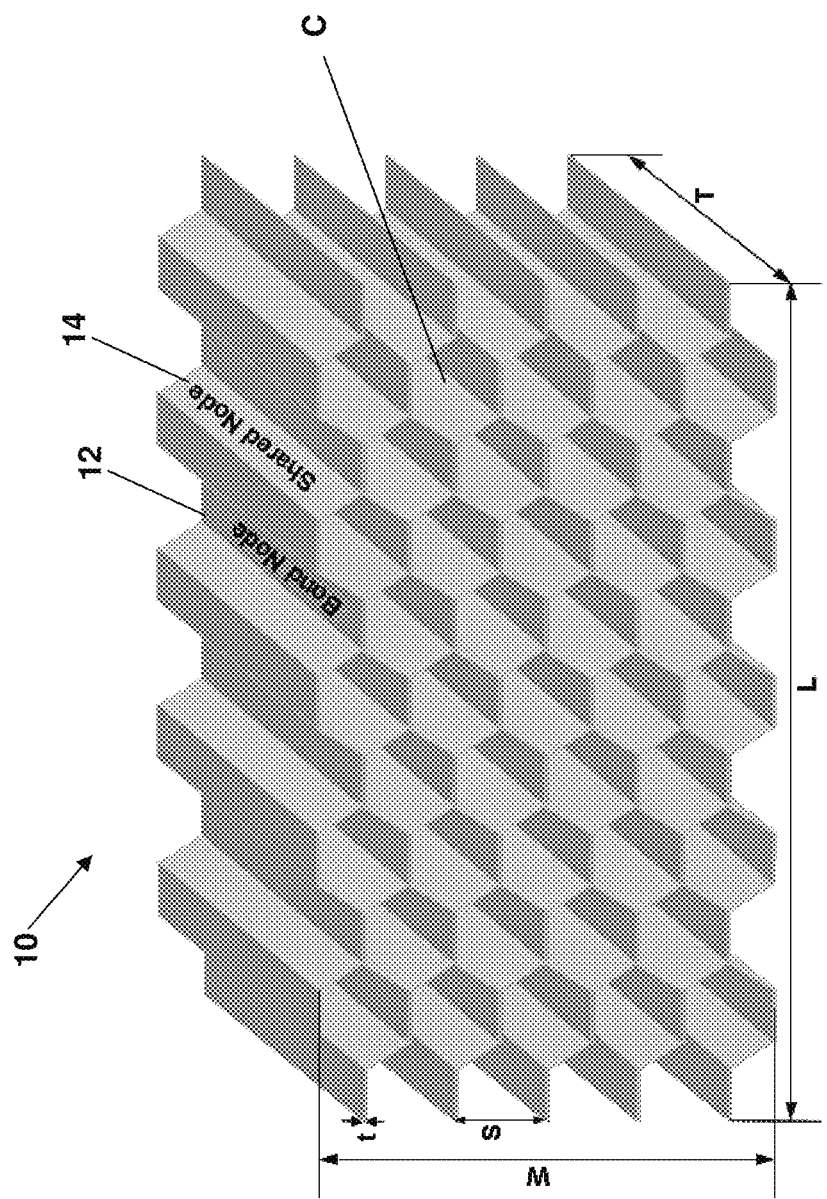
FIG. 2 includes a schematic illustration of a honeycomb core structure. L is the longitudinal direction, W is the transverse direction, and T is the through thickness direction, t is the node thickness, and S is the cell size that is the short cell diameter.

Since steel sheets are almost two (2) times denser than aluminum sheets, one concern is that GFS honeycomb cores may be too heavy to use. However, in comparing the crush strengths of GFS and aluminum honeycomb cores that have the same densities it is contemplated that this is not the case. In hexagonal honeycomb cores that are manufactured by bonding the corrugated thin sheets (foils), each unit cell may consist of four shared nodes and two bond nodes (FIG. 2). The honeycomb core density ($\rho$) may be understood herein to be determined by node thickness to cell size ratio and the density of the corresponding solid metal ($\rho_s$) from which the honeycomb core is made, i.e.

$$\rho = \frac{8}{3\sqrt{3}}\left(\frac{t}{S}\right)\rho_s.$$

Therefore, the crush strengths may be quantitatively compared by calculating the strength ratio of honeycomb cores with the same density but made from GFS sheets and aluminum foils, respectively. The calculated crush strength ratios values presented in Table 11 illustrate that the GFS honeycomb cores may still be stronger when they are made into the similar low densities as their aluminum counterparts. Honeycomb core densities may be 2.97 lb/ft³ and 2.84 lb/ft³ for aluminum and GFS alloys, respectively.

TABLE 11

Crush Strength Ratio of Honeycomb Cores Made from GFS and Al Alloys

| Aluminum Alloys | ALLOY 40 | ALLOY 48 | ALLOY 58 | ALLOY 59 |
|---|---|---|---|---|
| Al 1100-H19 | 2.64 | 2.78 | 3.56 | 2.96 |
| Al 1235-H19 | 3.26 | 3.43 | 4.39 | 3.65 |
| Al 3003-H19 | 2.22 | 2.33 | 2.99 | 2.48 |
| Al 5052-H19 | 1.68 | 1.77 | 2.26 | 1.88 |
| Al 5056-H191 | 1.23 | 1.30 | 1.66 | 1.38 |

Figure 4:
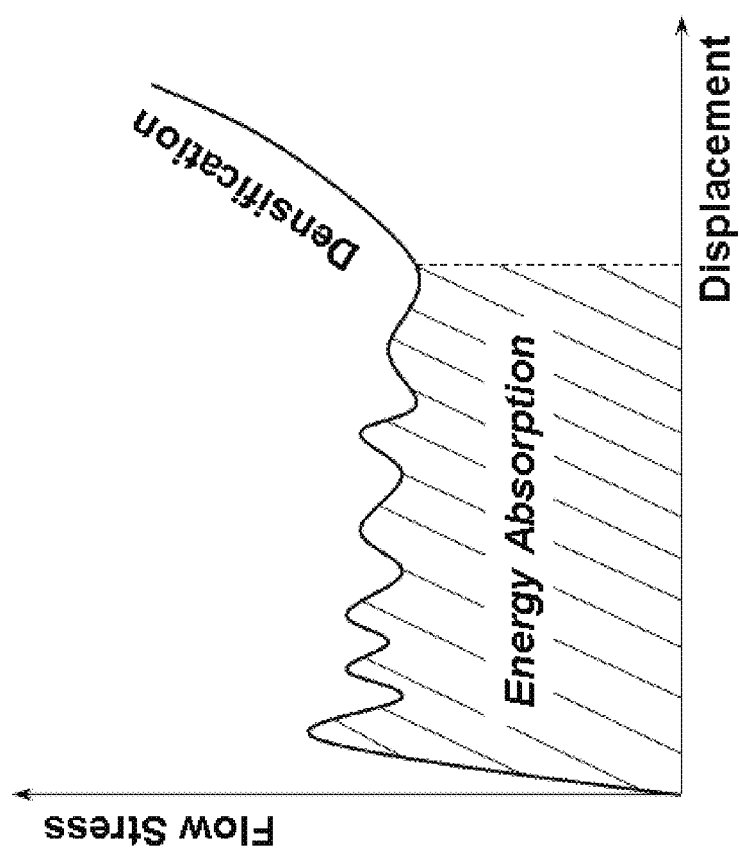
FIG. 4 illustrates a schematic illustration of stress-displacement behavior for typical ductile metallic honeycomb cores.

In most cases, it is contemplated that GFS honeycomb cores may be two to three times stronger than their aluminum counterparts. Even compared with Al 5056-H191 and Al 5052-H19 the stronger of aluminum foils, GFS honeycomb cores may still have higher crush strengths at the same density. The increase in crush strength by using GFS sheets may lead to three observations for designing and application of lightweight high strength honeycomb structures. One observation is that the energy absorption may be defined by the area under the plateau stress in the stress-strain curve (FIG. 4). The combination of the compatible or better ductility and higher crush strengths may increase energy absorption capability by up to 3 to 4 times. This may improve vehicle safety when GSF honeycomb structures are used. Secondly, the crush strength of honeycomb core may be determined by the combination of its density and the strength of the node metal. GFS alloys with relatively high strength up to one order of magnitude higher than the aluminum counterparts may provide a room to reduce core density without reducing crush strength. Therefore, it is contemplated that the use of the GFS alloys for making honeycomb core may reduce the body weight and gas emission for automobiles, while the vehicle safety factor may be retained. Third, it is contemplated that the relatively high strength and compatible ductility of GFS alloys may provide more options for the design of future automobiles. Honeycomb structures may be used to make various components for different functions under various loading and potential damage conditions.

Case Studies

Case Example #1

Increasing Tensile Strength with Ribbon Thickness

As relatively lightweight structures used for the purpose of load bearing, the density and strength may be considered tow important parameters affecting application and performance, although thermal conductivity and corrosion resistance may also be frequently required. Accordingly, a desirable honeycomb core may have a combinative relatively high strength and low density. However, strength increase may generally be achieved at the cost of raising density, i.e. increasing node thickness. For many aluminum alloys, the sheet strength decreases with increasing thickness, as being pointed out earlier. This may make increasing node thickness to be even less efficient approach to manufacture high strength honeycombs.

Compared to some aluminum alloys used in honeycomb structures, GFS sheets are contemplated to exhibit greater strength-to-density ratios (Table 11). In addition, it is contemplated that the strength of GFS sheets may be controlled by changing sheet thickness. In Table 12, the tensile strength as a function of thickness is listed for several selected GFS alloys. For instance, Alloy 48 steel sheets produced at tangential velocity 39 m/s are ~0.03 mm thick and have tensile strengths of 2.79±0.35 GPa, while GFS foils produced at 10.5 m/s are ~0.07 mm thick and have strength up to 3.49±0.22 GPa. Thus increasing crush strength may be achieved by selecting high-strength GFS sheets and simultaneously reducing the density of honeycomb cores. Therefore, it is contemplated that the strength-density conflict may be solved by using thicker glass forming steel sheets. This may be particularly effective where relatively high strength honeycomb structures are in need. In Table 13, the calculated crush strengths show the wide ranges of crush strength, which may translate to a spectrum of design choices with honeycomb structures formed from glass forming steel sheets.

TABLE 12

Tensile Strength as a Function of Thickness for GFS Sheets Made from Alloy 48

| Melt-Spinning Velocity | Foil thickness | | Strength (GPa) | | Strength (ksi) | |
| --- | --- | --- | --- | --- | --- | --- |
| (m/s) | mm | inch | Average | STDEV | Average | STDEV |
| 39.0 | 0.03 | 0.001 | 2.79 | 0.35 | 405.1 | 50.8 |
| 16.0 | 0.05 | 0.002 | 3.03 | 0.28 | 439.7 | 40.7 |
| 10.5 | 0.07 | 0.003 | 3.49 | 0.22 | 505.8 | 31.2 |

TABLE 13

Crush Strength and Cell Geometries for Honeycomb Cores Designed with GFS Sheets of Different Thickness Made from Alloy 48

| Melt-Spinning Velocity | Cell Size | | Node Thickness | | Honeycomb Core Density | | | Crush Strength | |
| --- | --- | --- | --- | --- | --- | --- | --- | --- | --- |
| (m/s) | Inch | mm | mm | inch | Normalized | lb/ft3 | g/cm3 | MPa | psi |
| 10.5 | 0.125 | 3.06 | 0.070 | 0.003 | 0.035 | 17.07 | 273.4 | 106.4 | 15,431 |
| | 0.156 | 3.82 | 0.070 | 0.003 | 0.028 | 13.68 | 219.1 | 73.5 | 10,667 |
| | 0.187 | 4.58 | 0.070 | 0.003 | 0.024 | 11.41 | 182.8 | 54.4 | 7,886 |
| | 0.250 | 6.13 | 0.070 | 0.003 | 0.018 | 8.53 | 136.7 | 33.5 | 4,861 |
| | 0.375 | 9.19 | 0.070 | 0.003 | 0.012 | 5.69 | 91.1 | 17.0 | 2,473 |
| | 0.500 | 12.25 | 0.070 | 0.003 | 0.009 | 4.27 | 68.4 | 10.6 | 1,531 |
| | 0.666 | 16.32 | 0.070 | 0.003 | 0.007 | 3.20 | 51.3 | 6.5 | 949 |
| | 0.750 | 18.38 | 0.070 | 0.003 | 0.006 | 2.84 | 45.6 | 5.4 | 779 |
| | 0.833 | 20.41 | 0.070 | 0.003 | 0.005 | 2.56 | 41.0 | 4.5 | 654 |
| | 0.875 | 21.44 | 0.070 | 0.003 | 0.005 | 2.44 | 39.1 | 4.2 | 602 |
| | 0.916 | 22.44 | 0.070 | 0.003 | 0.005 | 2.33 | 37.3 | 3.8 | 558 |
| | 1.000 | 24.50 | 0.070 | 0.003 | 0.004 | 2.13 | 34.2 | 3.3 | 482 |
| 16 | 0.125 | 3.06 | 0.050 | 0.002 | 0.025 | 12.19 | 195.3 | 52.7 | 7,647 |
| | 0.156 | 3.82 | 0.050 | 0.002 | 0.020 | 9.77 | 156.5 | 36.4 | 5,286 |
| | 0.187 | 4.58 | 0.050 | 0.002 | 0.017 | 8.15 | 130.6 | 26.9 | 3,908 |
| | 0.250 | 6.13 | 0.050 | 0.002 | 0.013 | 6.10 | 97.7 | 16.6 | 2,409 |
| | 0.375 | 9.19 | 0.050 | 0.002 | 0.008 | 4.06 | 65.1 | 8.4 | 1,225 |
| | 0.500 | 12.25 | 0.050 | 0.002 | 0.006 | 3.05 | 48.8 | 5.2 | 759 |
| | 0.666 | 16.32 | 0.050 | 0.002 | 0.005 | 2.29 | 36.7 | 3.2 | 470 |
| | 0.750 | 18.38 | 0.050 | 0.002 | 0.004 | 2.03 | 32.6 | 2.7 | 386 |
| | 0.833 | 20.41 | 0.050 | 0.002 | 0.004 | 1.83 | 29.3 | 2.2 | 324 |
| | 0.875 | 21.44 | 0.050 | 0.002 | 0.004 | 1.74 | 27.9 | 2.1 | 299 |
| | 0.916 | 22.44 | 0.050 | 0.002 | 0.003 | 1.66 | 26.7 | 1.9 | 277 |
| | 1.000 | 24.50 | 0.050 | 0.002 | 0.003 | 1.52 | 24.4 | 1.6 | 239 |

TABLE 13-continued

Crush Strength and Cell Geometries for Honeycomb Cores Designed
with GFS Sheets of Different Thickness Made from Alloy 48

| Melt-Spinning Velocity | Cell Size | | Node Thickness | | Honeycomb Core Density | | | Crush Strength | |
|---|---|---|---|---|---|---|---|---|---|
| (m/s) | Inch | mm | mm | inch | Normalized | lb/ft3 | g/cm3 | MPa | psi |
| 39 | 0.100 | 2.45 | 0.030 | 0.001 | 0.019 | 9.14 | 146.5 | 30.1 | 4,359 |
|  | 0.125 | 3.06 | 0.030 | 0.001 | 0.015 | 7.32 | 117.2 | 20.7 | 3,005 |
|  | 0.156 | 3.82 | 0.030 | 0.001 | 0.012 | 5.86 | 93.9 | 14.3 | 2,077 |
|  | 0.187 | 4.58 | 0.030 | 0.001 | 0.010 | 4.89 | 78.3 | 10.6 | 1,536 |
|  | 0.250 | 6.13 | 0.030 | 0.001 | 0.008 | 3.66 | 58.6 | 6.5 | 947 |
|  | 0.375 | 9.19 | 0.030 | 0.001 | 0.005 | 2.44 | 39.1 | 3.3 | 482 |
|  | 0.500 | 12.25 | 0.030 | 0.001 | 0.004 | 1.83 | 29.3 | 2.1 | 298 |
|  | 0.666 | 16.32 | 0.030 | 0.001 | 0.003 | 1.37 | 22.0 | 1.3 | 185 |
|  | 0.750 | 18.38 | 0.030 | 0.001 | 0.003 | 1.22 | 19.5 | 1.0 | 152 |
|  | 0.833 | 20.41 | 0.030 | 0.001 | 0.002 | 1.10 | 17.6 | 0.9 | 127 |
|  | 0.875 | 21.44 | 0.030 | 0.001 | 0.002 | 1.05 | 16.7 | 0.8 | 117 |
|  | 0.916 | 22.44 | 0.030 | 0.001 | 0.002 | 1.00 | 16.0 | 0.7 | 109 |

Figure 5:
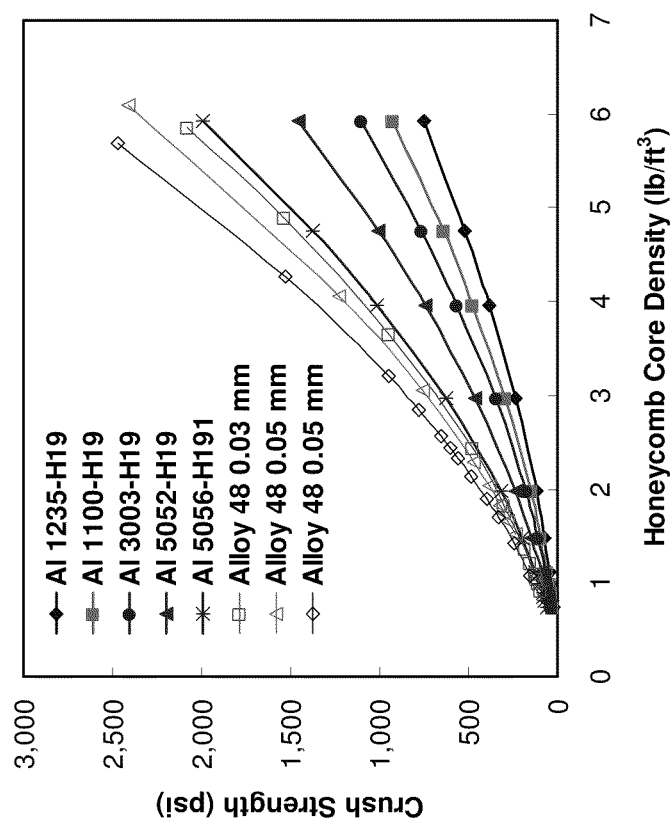
FIG. 5 illustrates examples of the crush strengths of the GFS honeycomb cores made from Alloy 48 of different sheet thickness in comparison to typical aluminum honeycomb cores (density <7 lb/ft$^3$).

Furthermore, because the GFS sheets exhibit increasing strength as thickness increases, it is also feasible to manufacture honeycomb core exhibiting the same strength but with different cell geometries including cell size and node thickness. It is also possible to make honeycomb core with different strengths but with the same cell geometries. In FIG. 5, the calculated crush strengths are plotted for the Alloy 48 that were melt spun at 39, 16, and 10.5 m/s. In this plot, the crush strengths of GFS honeycomb cores are compared with the calculated values for aluminum honeycomb cores. At relatively low core density ranges between 1 to 6 lb/ft$^3$, honeycomb cores made from the thinnest Alloy 48 foils (produced at a tangential velocity 39 m/s) cores may exhibit a similar strengths as the 5056 H191 cores which a relatively stronger grade of aluminum alloy available. However, if thicker sheets are used, the strength may be greater at any core density.

Figure 6:
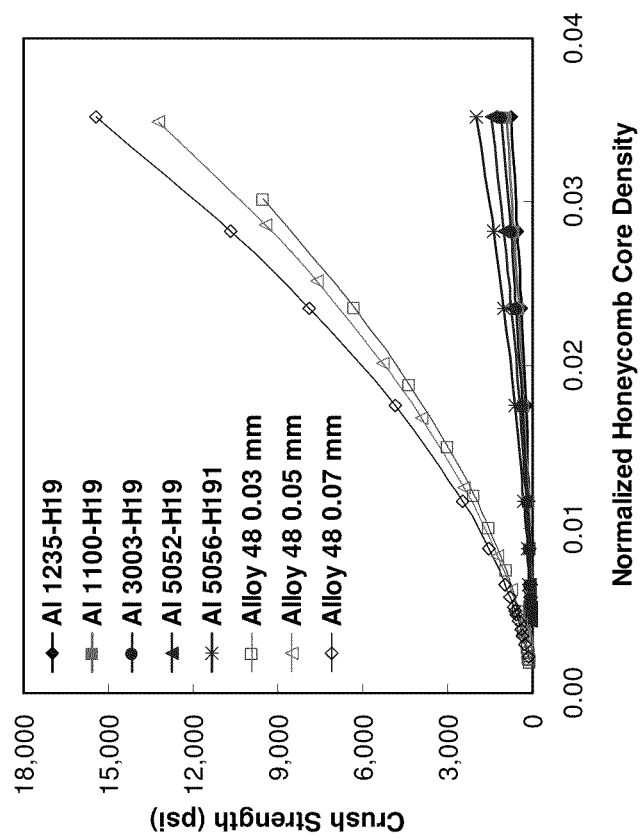
FIG. 6 illustrates the crush strength of GFS honeycomb structures and aluminum honeycomb structures based on normalized honeycomb core density.

It is contemplated that the glass forming steel sheets may widen the density range for honeycomb structures (FIG. 6). When manufactured using glass forming steel sheets made from ALLOY 48 at melt-spinning velocity 10.5 m/s, honeycomb structures with normalized density of about 0.02 lb/ft$^3$ have crush strength up to 127 psi, which is more than two times of the aluminum honeycomb at density of 0.04 lb/ft$^3$. At density of ~0.03 lb/ft$^3$, it is contemplated that GFS honeycomb structures may be made with crush strength higher than 10,000 psi, which is one order of magnitude stronger than the strongest aluminum honeycomb at similar density.

Figure 7:
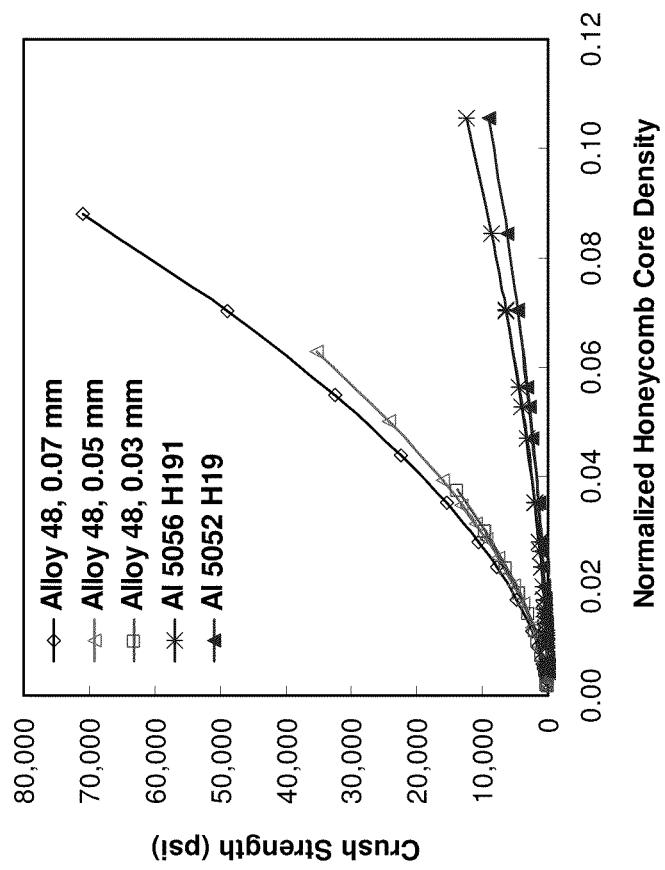
FIG. 7 illustrates the crush strength of GFS honeycomb structures and aluminum honeycomb structures based on normalized honeycomb density.

Among the aluminum alloys that may be used to manufacture commercial honeycomb cores, it is understood that the 5056 H191 alloy are among the higher in strength. In addition, relatively high density-high strength aluminum honeycomb cores have been reported to be manufactured from 5052 H19 alloy. In the low density range, it appears that both may be relatively weaker than the calculated strength of GFS honeycomb cores (FIG. 6). At higher density range, the calculated trends appear to become more drastic, as shown in FIG. 7. The 5056 H191 honeycomb crush strength appear to be improved to a level of ~9,000 psi, when the density is pushed to more than 0.1 lb/ft$^3$, or 10% of that of the fully dense solid aluminum alloy. However, for GFS honeycomb, it is contemplated that relatively high strength core can be produced with a relatively small normalized density. For instance, if GFS foils made from Alloy 48 are used, the same crush strength level may be obtained at a normalized density of merely 2% to 3%.

Figure 8:
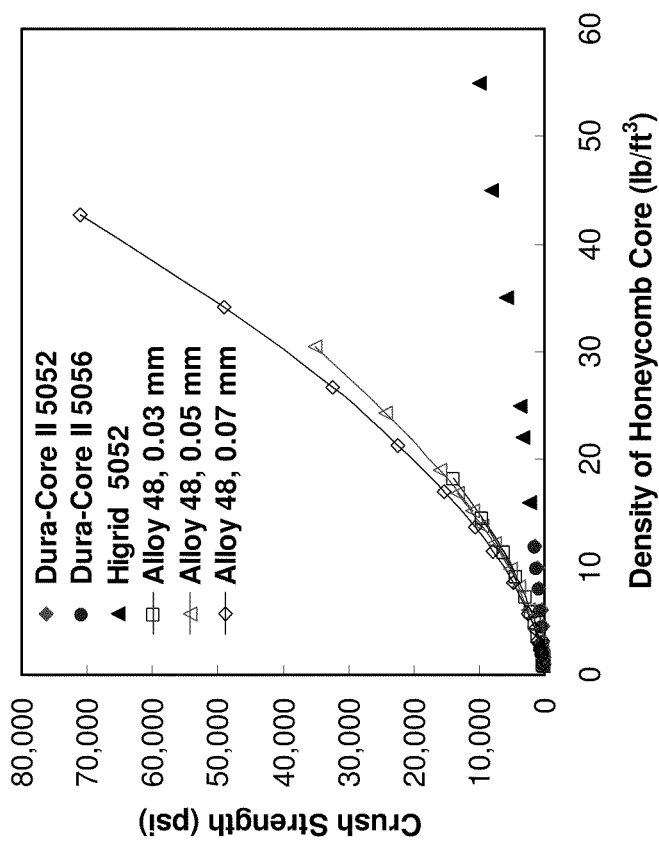
FIG. 8 illustrates the crush strength of GFS honeycomb cores in comparison to commercial aluminum honeycomb cores of Dura-Core II 5052, Dura-Core II 5056 and Higrid 5052 all available from M.C. Gill Corp. of Edgewood, Md.

In the applications where relatively high core strengths are required, commercial aluminum honeycomb cores are understood to be manufactured by increasing the node thickness. This may compromise the lightweight characteristic that is may be a characteristic in the application of honeycomb structures. In FIG. 8, crush strength of 10,000 psi may be achieved at a density of about 60 lb/ft$^3$ for aluminum alloys. If glass forming steel sheets of Alloy 48 melt-spun at 10.5 m/s are used, it is calculated that the core density may be controlled within the range of less than 20 lb/ft$^3$. Thus, it is contemplated that the core density may be reduced to one third with similar or greater crush strengths retained when aluminum foils are replaced by glass forming steel sheets. Moreover, the relatively high calculated strength of up to 45,000 psi of GFS honeycomb does not appear to be matched by available aluminum alloys with existing manufacturing technique.

Case Example 2

Continuous Corrugation of Narrow GFS Sheets

Figure 9:
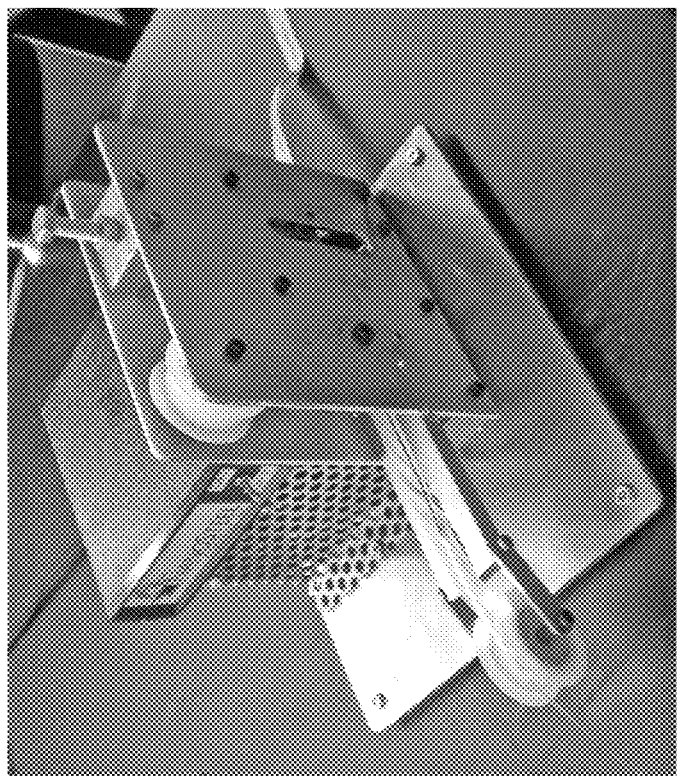
FIG. 9 illustrates a lab scale corrugation machine built up to form corrugated narrow sheets for making honeycomb core structures.
Figure 10:
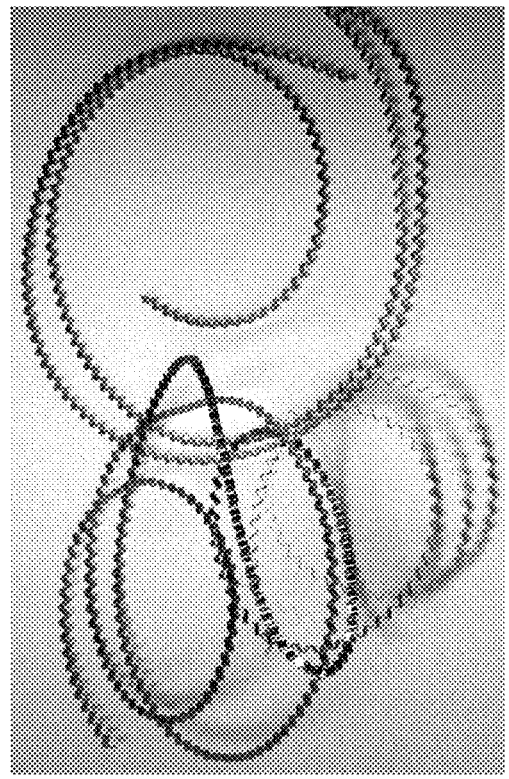
FIG. 10 illustrates an example of corrugated narrow sheets made from Alloy 48 melt-spinning at tangential velocity of 10.5 m/s.

To mimic the first stage in the honeycomb manufacture for our narrow GFS sheets, a lab scale corrugation machine was built (FIG. 9). The design concept is to run the narrow sheets through two gears, one gear being the drive, and the other being the idler. The particular spur gears used are 1.31" outside diameter (40 teeth, 32 pitches) and the drive gear is driven by an AC gear motor turning 35 RPM with 20 In-lbs torque. The idler gear is mounted to a swing arm that allows for pressure adjustment. The pressure is applied by a precision compression spring rated at 22.8 lbs with a rate of 33 lbs/in. A table with inset magnets helps to align the narrow sheet as it feeds into the gears. Teflon® tape is dispensed above and below the ribbon to eliminate sticking and to confine pieces if the ribbon should break. Operating consists of confirming the tapes through the rollers; placing the narrow sheets on the table above the Teflon tape; while keeping firm tension on the outlet tape, turn the machine on until all the ribbon has passed through the gears. The tape is cut allowing enough to hold for the next run. Continuous narrow GFS sheets with different alloy compositions were formed into corrugated states that would be ready to be bond for making honeycomb core structures. Examples of corrugated narrow sheets are shown in FIG. 10.

GFS sheets of different thickness made from a variety of alloys have been corrugated using this machine. Continuous long corrugated sheets were obtained from numerous ductile alloys. Depending on the distribution of brittle defects in the narrow sheets, the corrugated sheet length varies from several tens centimeters to hundreds centimeters. In Table 14, the results of corrugation study are provided for several selected narrow sheets. Such length of corrugated GFS sheets did not appear to exhibit problems with meeting the requirements to make honeycomb cores with large dimensions. Note longer corrugated GFS sheets should be able to be produced as wider sheets are manufactured using different methods, because isolated defects in the sheets may not lead to breakage in the wider sheets.

TABLE 14

Corrugation Properties of Selected Narrow GFS sheets

| Alloy | Melt-Spinning Velocity (m/s) | Longest Corrugated Segments (m) | Number of Breaks Per Meter (#/m) |
|---|---|---|---|
| ALLOY 40 | 10.5 | 8.8 | 15 |
| ALLOY 48 | 10.5 | 72 | 0 |
| ALLOY 49 | 16 | 78 | 0 |
| ALLOY 51 | 16 | 70 | 1 |
| ALLOY 58 | 16 | 48 | 1 |
| ALLOY 59 | 16 | 79 | 0 |

Figure 11:
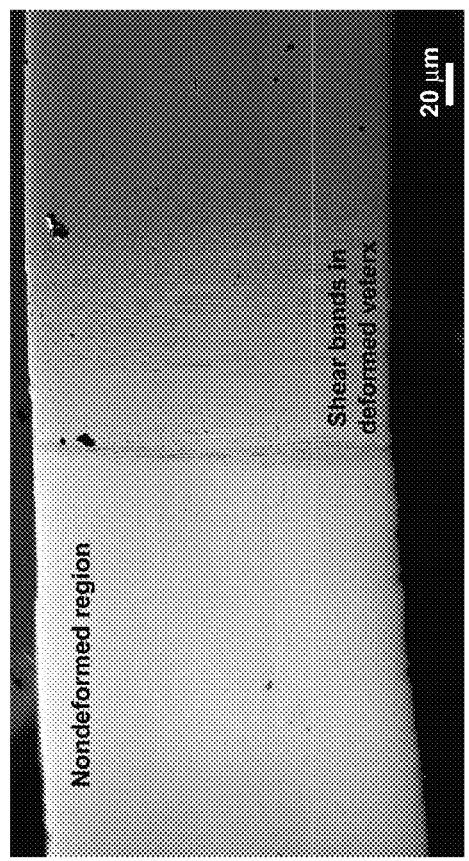
FIG. 11 illustrates an SEM image showing the plastic deformation preferably occurs in the corrugation vertex region.

The ductile deformation in the GFS sheets after corrugation was examined in a scanning electron microscope (SEM). Representative SEM images (FIG. 11) shows that most permanent deformation appears to occur only in the corrugation vertex, as illustrated by the high density shear bands in these regions. In the segment between two vertexes, the sheet remains undeformed and shear bands are not observed. When the corrugated sheets were subjected to tensile loading, the tensile strength appears to be only slightly reduced. This suggests that the deformation in the corrugation vertices may lead to minor loss of tensile strength and that the deformed regions may have compatible capability to carry out tensile of shear loading as the undeformed regions.

Case Example 3

Compression Behavior of Corrugated GFS Steel Sheets

Figure 12:
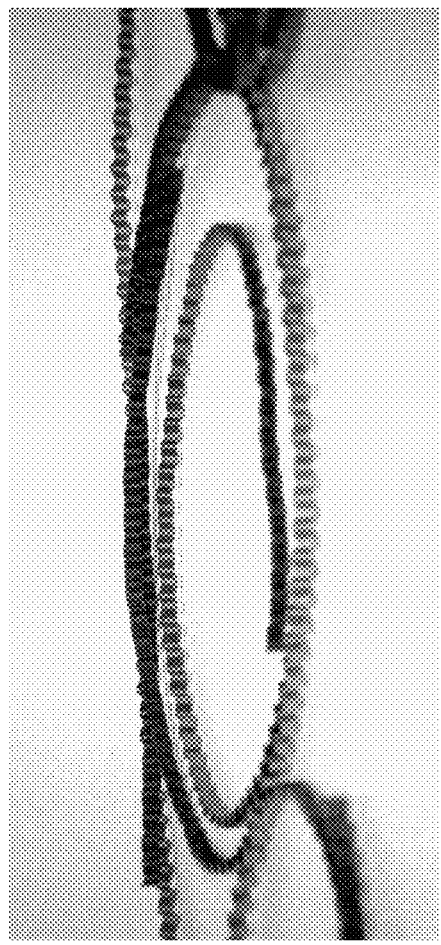
FIG. 12 illustrates a digital image of the loop formed by binding the corrugated steel sheets.

Using high purity elements, a fifteen gram charge of Alloy 48 alloy was weighed out according to the atomic ratios shown in Table 2. Note that depending on the exact high purity feedstock source, impurities of other elements may be present. For example for Alloy 48, carbon impurity levels are estimated to be in the range of 0.1 to 0.25 atomic % carbon. The mixture of elements was placed onto a copper hearth and arc-melted into an ingot using ultrahigh purity argon as a cover gas. After mixing, the resulting ingot was cast into a finger shape appropriate for melt-spinning. The cast fingers were then placed into a quartz crucible with a hole which has a diameter nominally at 0.81 mm. The ingots were heated up by RF induction and then ejected onto a rapidly moving 245 mm copper wheel traveling at a wheel tangential velocity of 10.5 m/s and 16 m/s, respectively. Corresponding to the two different tangential wheel speeds, the resulting ribbons have thickness of ~75 µm and ~55 µm, respectively. The sheets were then manually corrugated to prepare compression samples, as shown in FIG. 12.

Figure 13:
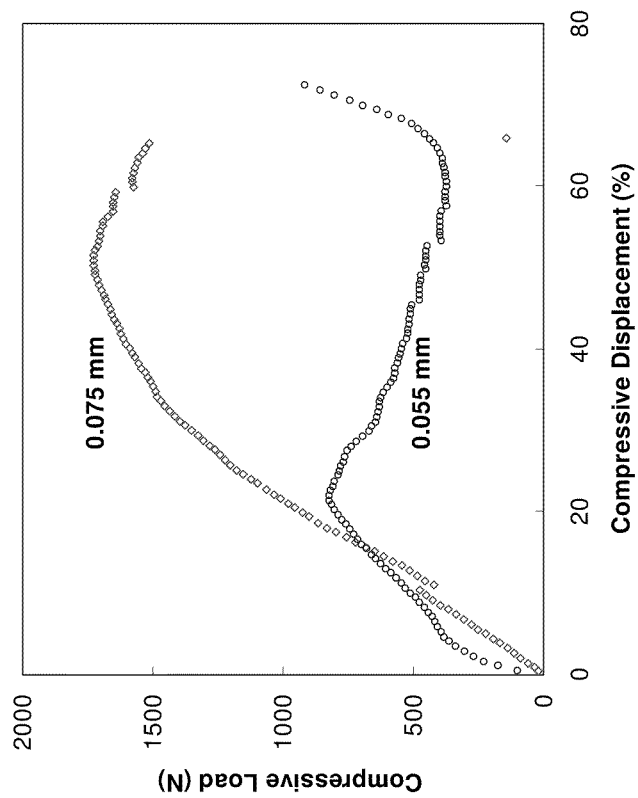
FIG. 13 illustrates a compressive load-displacement curves for the corrugated sheets of two different thickness values.

In order to evaluate the mechanical behavior of honeycomb cores made from our GFS sheets, compression testing was performed by applying uniaxial compressive loading in a direction that is parallel to the sheet width direction, which is equivalent to the through thickness direction in honeycomb cores (T direction in FIG. 2). Representative load-displacement curves are displayed in FIG. 13 for a thick sheet (75 µm) and for a thin sheet (55 µm) that were both produced from Alloy 48. For both cases, the corrugated sheets were able to sustain continuous plastic deformation up to 60%.

However, the compressive deformation behavior of the honeycomb cores is affected by sheet thickness. For the thin sheet (55 µm), the flow stress continuously drops after linear stage deformation, indicating occurrence of plastic buckling. For the thick sheet (75 µm), there is evident strain hardening after linear stage deformation. This indicates that buckling does not take place for thick ribbon. Rather, plastic deformation appears to be due to compressive plastic deformation. However, this is followed by wall collapse and a sudden rupture at a displacement around 60%. In contrast, buckling is followed by gradual densification as the buckled walls get contact for the thin sheets. It is important to note that the compression testing of the corrugated samples clearly shows that the GFS amorphous steel sheets are relatively ductile under compressive loading.

Case Example 4

The Nanoscale SGMM Structure in Alloy 40 Narrow Sheet

Alloy 40 GSF sheets have shown to exhibit ductility and under uniaxial tensile loading, the narrow sheets can be stretched up to 4% elongation at breaking. The measured ultimate tensile strengths range from 2.90 GPa to 3.17 GPa. To investigate the enabling nanoscale structure, TEM specimens were prepared from the narrow GFS sheets that were prepared from Alloy 40 using melt-spinning at a tangential velocity of 10.5 m/s. In brief, a sheet samples of ~5 mm long and ~0.075 mm thick was cut and thinned down to less than 10 µm thick using grinding and combined-mechanical-chemical polishing. The TEM foil was then ion milled in a Gatan Precision Ion Polishing System (PIPS), which was operated at an ion beam energy level of ~4 keV. The ion beam incident angle was 10° first, then reduced to 7° after penetration, and finished up by further reducing the angle to 4°. This ensures the thin areas to be large and thin enough for TEM examination.

Figure 14:
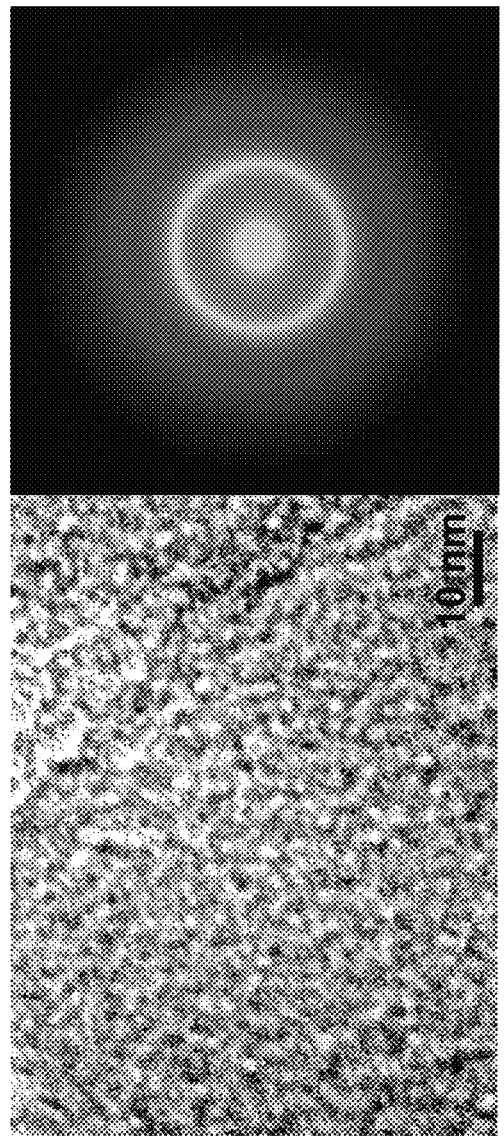
FIG. 14 illustrates a TEM micrograph (left) and the corresponding SAED pattern (right) of the nanoscale SGMM microstructures in the ribbon wheel side.

The nanoscale structure in the wheel side, i.e., the side formed proximal/touching the melt spinning wheel, is featured by modulated patterns consisting of randomly oriented short stripes (TEM image on the left side of FIG. 14). The thickness of the stripes is about 3 nm (illustrated scale is 10 nm). Such structure may be formed as a result of spinodal decomposition, in which the neighboring stripes have different concentrations. Therefore, spinodal glass matrix microconstituent (SGMM) structure is formed in the wheel side. Corresponding to the area shown in FIG. 14, the selected area electron diffraction (SAED) pattern (on the right side of FIG. 14) consists of a relatively strong amorphous halo and a relatively weak additional diffraction ring. The amorphous halo exhibiting relatively high intensity indicates that the majority of the sheet in the wheel side remains amorphous. The additional relatively weak ring is the diffraction from some crystalline phases. The weak intensity is indicative of a small volume fraction of the crystalline phases; the diffuse feature is due to the extremely small crystalline sizes, which may not be greater than the short stripe thicknesses.

Figure 15:
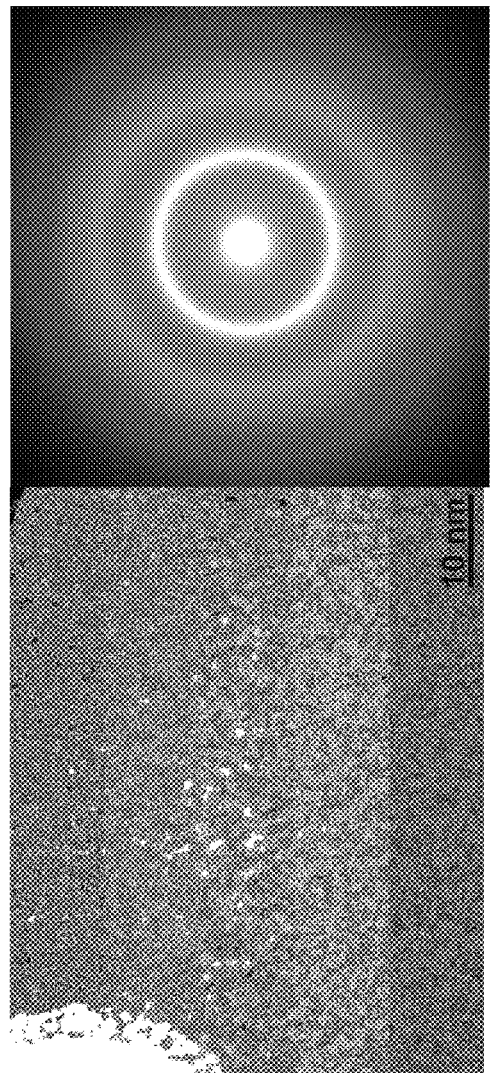
FIG. 15 illustrates a TEM micrograph (left) and the corresponding SAED pattern (right) of the nanoscale SGMM structure in the ribbon free side.

The nanoscale structure in the sheet free side, i.e., the side formed distal from the wheel, has similar features as in the wheel side (TEM image on the left side of FIG. 15). The stripe thickness and the random orientation are also similar to those in the wheel side. The SAED pattern (right image in FIG. 15) also consists of a relatively strong amorphous halo exhibiting a relatively high intensity and an additional diffuse diffraction ring that is relatively weak in intensity. These show that the free side has similar spinodal glass matrix microconstituent (SGMM) structure as the wheel side.

Figure 16:
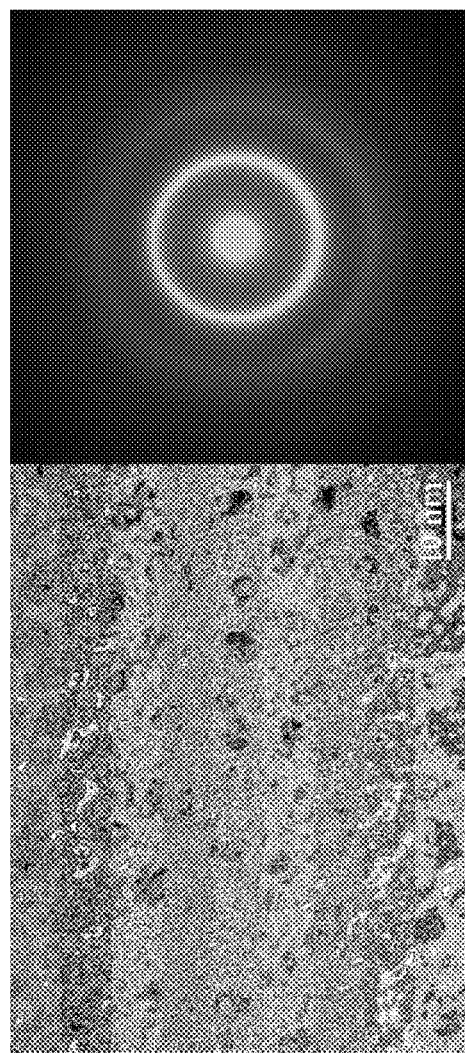
FIG. 16 illustrates a TEM micrograph (left) and the corresponding SAED pattern (right) of the nanoscale SGMM structure in the central region of the ribbon.

In the central region of the ribbon, i.e., between the wheel and free side, the nanoscale SGMM structure is characterized by grain-like domains dispersed in matrix. In the left TEM micrograph of FIG. 16, these domains exhibit relatively darker contrast. They are homogeneously distributed in the matrix, which shows relatively lighter contrast. The domain sizes generally range from 5 nm to 10 nm. Although each individual domain exhibits uniform contrast, multiple nanoscale stripes inside are still discernable. They are so short that they may be better described as particulates. At current stage, it is not known what the structural and phase differences are between the grain-like domains and the surrounding matrix.

However, the corresponding SAED pattern (right side of FIG. 16) still remains to be similar to those obtained from the wheel side and the free side. This suggests that the amorphous phase remains to be the majority in the ribbon central region, and that the volume fraction and the sizes of the nanocrystalline phases are still small. Thus, the fundamental feature of the SGMM structure, the modulated nanoscale patterns formed due to spinodal decomposition in the glass matrix, are formable even at relatively slower cooling rates in the central region of a ribbon. The slower cooling rates allow more time and provide more heat flux to form grain-like domains in the glass matrix.

In a summary, the TEM results indicate that glass remains to be the major component in the GFS narrow sheets. Similar phase constituents may be formed in the different regions across the sheet thickness, which experience different cooling rates during solidification. The nanoscale SGMM structure exhibits different morphologies that may be dependent on cooling rates. When the cooling rates are relatively fast in the wheel and free sides, the SGMM exhibits a modulated patterns consisting of randomly oriented short stripes. When the cooling rates are relatively slow (in the central region) the nanoscale grain-like domains are formed and dispersed in the surrounding matrix. Inside both the domains and the matrix, the short stripes appear more like particulates. Moreover, the ribbon appears to exhibit symmetric microstructural features in its overall cross section. The combination of the uniform phase constituents and the symmetric morphologies across thickness appears to be different from nanocrystals that are strong but extremely brittle. It is also distinguished from pure metallic glasses which exhibit relatively no elongation under tensile loading. The ribbons with the nanoscale SGMM structure demonstrate elongation up to 5% at a relatively high strength up to 4 GPa.

Case Example #5

Strain Hardening and Deformation Mechanism

To investigate the deformation mechanisms in the GFS sheets, narrow sheets were prepared from Alloy 40 at a tangential wheel speed 10.5 m/s using the same procedure as introduced earlier. Tensile testing was then carried out on the narrow sheets following the same testing procedure as introduced earlier. Note that the gage length of 20 mm was used.

Figure 17:
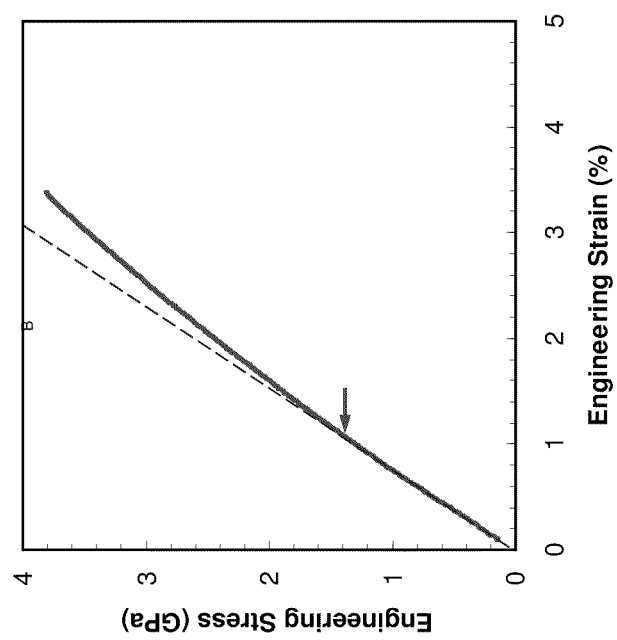
FIG. 17 illustrates a stress-strain curve of a narrow sheet made from Alloy 40 shows evident strain hardening.

The stress-strain curve is shown in FIG. 17 for the narrow sheet sample that was tested and examined in SEM. After linear elastic deformation limit that is indicated by the arrow, plastic deformation may be accomplished through relatively significant strain hardening which is evident as compared with the extension of the linear elastic curve (dashed line). To understand the physical mechanisms of the strain hardening, the tested narrow sheet samples were carefully examined in SEM.

Figure 18:
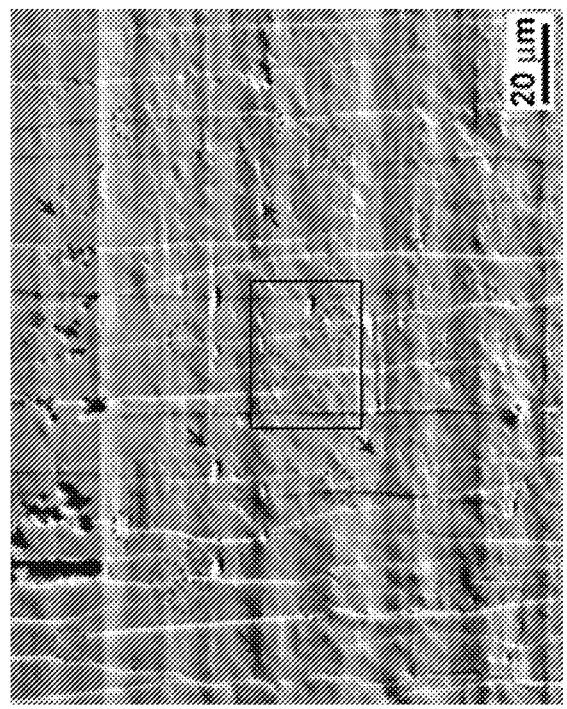
FIG. 18 illustrates an induced shear band arresting/blunting (ISBB/ISBA) mechanism observed in the surface of the tested narrow sheet specimen.
Figure 19:
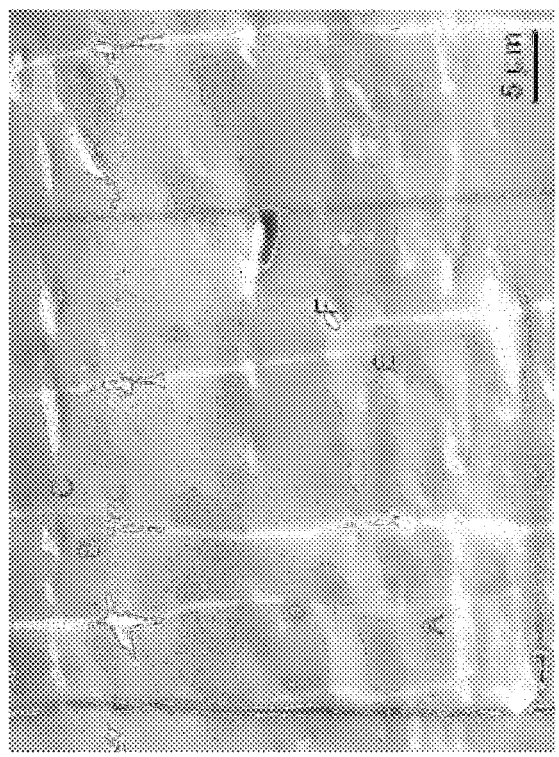
FIG. 19 illustrates an ISBB/ISBA of a single shear band (A) and pairs of shear bands (B and C, E and F).

In the relatively highly deformed regions, relatively high density shear bands were observed as expected and shown in FIG. 18. The average space between neighboring shear bands is around 5 to 10 µm. It was found that most of these shear bands are arrested or blunted at different developing stages. Some of the shear bands were arrested, involving no other shear bands in a reasonable distance, as indicated by the blue arrows in FIG. 18. However, most shear bands appear to be arrested as the result of blunting by other shear band that runs close or into to them as indicated by the red circles in FIG. 18. They are called induced shear band blunting/arresting (ISBB/ISBA). A selected area in FIG. 18 is magnified to display more details about the ISBB or ISBA deformation mechanisms in FIG. 19.

The foregoing description of several methods and embodiments has been presented for purposes of illustration. It is not intended to be exhaustive or to limit the claims to the precise steps and/or forms disclosed, and obviously many modifications and variations are possible in light of the above teaching. It is intended that the scope of the invention be defined by the claims appended hereto.

What is claimed is:

1. A method of forming an iron based glass forming honeycomb structure, comprising:
    forming at least two sheets, wherein each sheet has a thickness in the range of 0.01 mm to 0.15 mm and is formed from an iron based glass forming alloy comprising 40 to 68 atomic percent iron, 13 to 17 atomic percent nickel, 2 to 21 atomic percent cobalt, 12 to 19 atomic percent boron, optionally 0.1 to 6 atomic percent carbon, optionally 0.3 to 4 atomic percent silicon, optionally 1 to 20 percent chromium, and said sheets exhibit spinodal glass matrix microconstituents including amorphous phases and/or crystalline phases;
    stacking said sheets;
    bonding said sheets together; and
    forming a honeycomb structure with said sheets, wherein said honeycomb structure includes a plurality of cells.

2. The method of claim 1, wherein said sheets bonded together are expanded to form said honeycomb structure.

3. The method of claim 1, further comprising corrugating said sheets.

4. The method of claim 1, wherein said iron based glass forming alloy comprises 43 to 68 atomic percent iron, 15 to 17 atomic percent nickel, 2 to 21 atomic percent cobalt, 12 to 19 atomic percent boron, optionally 1 to 6 atomic percent carbon and optionally 0.4 to 4 atomic percent silicon.

5. The method of claim 1, wherein said iron based glass forming alloy comprises 40 to 65 atomic percent iron, 13 to 17 atomic percent nickel, 2 to 12 atomic percent cobalt, 12 to 17 atomic percent boron, 0.3 to 4 atomic percent silicon and 1 to 20 atomic percent chromium.

6. The method of claim 1, wherein said sheets are formed combining the alloy constituents together by melting, forming said feedstock into a sheet and cooling said feedstock at a cooling rate in the range of $10^4$ to $10^6$ K/s.

7. The method of claim 1, wherein said iron based glass forming alloy exhibits an ultimate tensile strength in the range of 1 GPa to 5 GPa, when measured at a strain rate of 0.001 $s^{-1}$.

8. The method of claim 1, wherein said iron based glass forming alloy exhibits one or more onset crystallization temperatures in the range of 360° C. to 610° C., when measured by differential thermal analysis or differential scanning calorimetry at a heating rate of 10° C/min.

9. The method of claim 1, wherein said iron based glass forming alloys exhibit one or more peak crystallization temperatures in the range of 400° C. to 650° C., when measured by differential thermal analysis or differential scanning calorimetry at a heating rate of 10° C/min.

10. The method of claim 1, wherein said iron based glass forming alloys exhibit a tensile elongation of 1% to 7%, when measured at a strain rate in the range of 0.001 s$^{-1}$.

11. The method of claim 1, wherein said honeycomb structure exhibits a crush strength in the range of 0.14 MPa to 520 MPa.

12. The method of claim 1, wherein said honeycomb structure exhibits a core density in the range of 16 g/cm$^3$ to 800 g/cm$^3$.

13. The method of claim 1, wherein said wherein said iron based glass forming alloy exhibits an ultimate tensile strength in the range of 1 GPa to 5 GPa, when measured at a strain rate of 0.001 s$^{-1}$, and a tensile elongation of 1% to 7%, when measured at a strain rate in the range of 0.001 s$^{-1}$.

14. The method of claim 1, wherein said honeycomb structure exhibits a crush strength in the range of 0.14 MPa to 520 MPa and a core density in the range of 16 g/cm$^3$ to 800 g/cm$^3$.

15. A honeycomb structure, comprising:
at least two sheets bonded together forming a plurality of cells, wherein each sheet has a thickness in the range of 0.01 mm to 0.15 mm and is formed from an iron based glass forming alloy comprising 40 to 68 atomic percent iron, 13 to 17 atomic percent nickel, 2 to 21 atomic percent cobalt, 12 to 19 atomic percent boron, optionally 0.1 to 6 atomic percent carbon, optionally 0.3 to 4 atomic percent silicon, optionally 1 to 20 percent chromium, and said sheets exhibit spinodal glass matrix microconstituents including amorphous phases and/or crystalline phases.

16. The honeycomb structure of claim 15, wherein said iron based glass forming alloy comprises 43 to 68 atomic percent iron, 15 to 17 atomic percent nickel, 2 to 21 atomic percent cobalt, 12 to 19 atomic percent boron, optionally 1 to 6 atomic percent carbon and optionally 0.4 to 4 atomic percent silicon.

17. The honeycomb structure of claim 15, wherein said iron based glass forming alloy comprises 40 to 65 atomic percent iron, 13 to 17 atomic percent nickel, 2 to 12 atomic percent cobalt, 12 to 17 atomic percent boron, 0.3 to 4 atomic percent silicon and 1 to 20 atomic percent chromium.

18. The honeycomb structure of claim 15, wherein said iron based glass forming alloy exhibits an ultimate tensile strength in the range of 1 GPa to 5 GPa, when measured at a strain rate of 0.001 s$^{-1}$.

19. The honeycomb structure of claim 15, wherein said iron based glass forming alloy exhibits one or more onset crystallization temperatures in the range of 360° C. to 610° C., when measured by differential thermal analysis or differential scanning calorimetry at a heating rate of 10° C/min.

20. The honeycomb structure of claim 15, wherein said iron based glass forming alloys exhibit one or more peak crystallization temperatures in the range of 400° C. to 650° C., when measured by differential thermal analysis or differential scanning calorimetry at a heating rate of 10° C/min.

21. The honeycomb structure of claim 15, wherein said iron based glass forming alloys exhibit a tensile elongation of 1% to 7%, when measured at a strain rate in the range of 0.001 s$^{-1}$.

22. The honeycomb structure of claim 15, wherein said honeycomb structure exhibits a crush strength in the range of 0.14 MPa to 520 MPa.

23. The honeycomb structure of claim 15, wherein said honeycomb structure exhibits a core density in the range of 16 g/cm$^3$ to 800 g/cm$^3$.

24. The honeycomb structure of claim 15, wherein said wherein said iron based glass forming alloy exhibits an ultimate tensile strength in the range of 1 GPa to 5 GPa, when measured at a strain rate of 0.001 s$^{-1}$, and a tensile elongation of 1% to 7%, when measured at a strain rate in the range of 0.001 s$^{-1}$.

25. The honeycomb structure of claim 15, wherein said honeycomb structure exhibits a crush strength in the range of 0.14 MPa to 520 MPa and a core density in the range of 16 g/cm$^3$ to 800 g/cm$^3$.

* * * * *

UNITED STATES PATENT AND TRADEMARK OFFICE
CERTIFICATE OF CORRECTION

| | | |
|---|---|---|
| PATENT NO. | : 8,497,027 B2 | Page 1 of 1 |
| APPLICATION NO. | : 12/941866 | |
| DATED | : July 30, 2013 | |
| INVENTOR(S) | : Daniel James Branagan et al. | |

It is certified that error appears in the above-identified patent and that said Letters Patent is hereby corrected as shown below:

In the Claims

In column 27, line 21, In Claim 13, delete "wherein said wherein said" and insert -- wherein said --, therefor.

In column 28, line 32-33, In Claim 24, delete "wherein said wherein said" and insert -- wherein said --, therefor.

Signed and Sealed this
Tenth Day of December, 2013

Margaret A. Focarino
*Commissioner for Patents of the United States Patent and Trademark Office*